United States Patent [19]
Naito

[11] Patent Number: 5,991,071
[45] Date of Patent: Nov. 23, 1999

[54] ACTIVE OPTICAL FIBER AND OPTICAL FIBER AMPLIFIER

[75] Inventor: Takao Naito, Kawasaki, Japan

[73] Assignee: Fujitsu Limited, Kawasaki, Japan

[21] Appl. No.: 09/161,985

[22] Filed: Sep. 29, 1998

[30] Foreign Application Priority Data

Apr. 27, 1998 [JP] Japan .................................. 10-117042

[51] Int. Cl.$^6$ ....................................................... H01S 3/00
[52] U.S. Cl. ............................................................. 359/341
[58] Field of Search ................................. 359/341; 372/6

[56] References Cited

U.S. PATENT DOCUMENTS

| | | | |
|---|---|---|---|
| 5,563,732 | 10/1996 | Erdogan et al. | 359/341 |
| 5,640,268 | 6/1997 | Chesnoy | 359/341 |
| 5,712,715 | 1/1998 | Erdogan et al. | 359/341 |

Primary Examiner—Mark Hellner
Attorney, Agent, or Firm—Staas & Halsey

[57] ABSTRACT

The present invention aims at providing an optical fiber amplifier in which a pumping light is rendered to make two or more reciprocations within an active optical fiber so as to enhance a conversion efficiency of power of pumping light thereby realizing further high-powerization. To this end, the present optical fiber amplifier is constituted of: a pumping light generating part for generating, based on a signal from an oscillator, the pumping light of which central wavelength is periodically varied; a multiplexer for multiplexing the pumping light and the signal light; an optical filter of central transmission wavelength variable type, which is coupled to one end of the active optical fiber, and has a transmission wavelength band narrower than a wavelength variation range of the pumping light, in which the central transmission wavelength of the transmission wavelength band is varied consistently with the central wavelength of the pumping light, based on a signal from a modulation circuit; and an optical reflector, which is coupled to the other end of the active optical fiber, and which reflects the pumping light and transmits the signal light.

20 Claims, 17 Drawing Sheets

ACTIVE OPTICAL FIBER AND OPTICAL FIBER AMPLIFIER

BACKGROUND OF THE INVENTION (1) Field of the Invention

The present invention relates to an active optical fiber doped with a rare earth element and an optical fiber amplifier, and more particularly to an active optical fiber and an optical fiber amplifier, in which the conversion efficiency of pumping light input into the active optical fiber is increased to improve optical amplification characteristics.

(2) Related Art

In conventional long-distance optical transmission systems, the transmission has been conducted by converting an optical signal into an electric signal, and by adopting an optical regenerating repeater which has functions of retiming, reshaping and regenerating. However, in recent years, optical fiber amplifiers have been put to practical use, so that an optical amplifying and repeating transmission method is now put under consideration in which an optical fiber amplifier is used as a linear repeater. By replacing an optical regenerating repeater with an optical amplifying repeater, the number of parts in the repeater can be reduced to a considerable extent, so that reliability is increased and substantial cost reduction can be expected.

Further, as one choice for realizing an optical transmission system of large-capacity, attention has been directed to a wavelength-division multiplexing (WDM) optical transmission system in which two or more signal lights having different wavelengths are multiplexed and transmitted within a single transmission path.

In a WDM optical amplifying and repeating transmission method which is provided by combining the WDM optical transmission system with the optical amplifying and repeating transmission method, usage of an optical fiber amplifier makes it possible to collectively amplify the two or more signal lights having different wavelengths, thereby enabling economical and large capacity and long-distanced optical transmission, by a simple construction.

FIG. 31 shows an example of basic construction of a conventional optical fiber amplifier (forward pumping).

In FIG. 31, a pumping light Lp output from a pumping light source 1 is multiplexed, at a multiplexer 2, with a signal light Ls from an input terminal T1, and then input into one end of an active optical fiber 3 depicted by a thick line. This active optical fiber 3 is the one doped with a rare earth element such as Erbium. When an optical fiber amplifier adopting this active optical fiber 3 is unsaturatedly operated, there can be obtained a flat gain wavelength characteristic, thereby realizing transmission of large capacity.

However, when the conventional optical fiber amplifier is unsaturatedly operated, only a part of the power of pumping light input into the active optical fiber 3 is used for pumping the rare earth element, and the remaining large part of power of pumping light is leaked to the backward side of the active optical fiber. Concretely, approximately 70% of the power of pumping light input into the active optical fiber 3 may pass therethrough, and only about 30% of the power is used to excite the rare earth element. Thus, the conventional optical fiber amplifier has been defective, as having a lower pumping efficiency.

There are also known other conventional optical fiber amplifiers which are contemplated to improve the pumping efficiency, such as disclosed by U.S. Pat. No. 5,138,483. Shown in FIG. 32 is a constitution of this conventional optical fiber amplifier.

In FIG. 32, the optical fiber amplifier, in which the pumping efficiency has been improved, is constituted by adding to that shown in FIG. 31 an optical reflector 4 which is disposed at a backward side of the active optical fiber 3 (i.e., at an outer side of the end opposite to the input end of pumping light). This reflector 4 reflects the pumping light Lp, and transmits the signal light Ls. The pumping light Lp is reflected by the reflector 4, to make one reciprocation within the active optical fiber 3, so as to improve the pumping efficiency. Concretely, approximately 50% of the power of input pumping light is used to excite the rare earth element.

However, even in the aforementioned conventional optical fiber amplifier which is contemplated to improve the pumping efficiency, the remaining approximately 50% of the power of pumping light is not effectively utilized yet. Further, the pumping efficiency may be deteriorated in that the power of signal light Ls to be output from the optical fiber amplifier is reduced such as due to insertion loss caused by the added optical reflector 4 and due to coupling loss at the coupling part where the optical reflector 4 is coupled to the active optical fiber 3.

SUMMARY OF THE INVENTION

The present invention has been carried out in view of the aforementioned points, and it is therefore an object of the present invention to provide an optical fiber amplifier in which a pumping light is rendered to make two or more reciprocations within an active optical fiber so as to enhance a conversion efficiency of power of pumping light thereby realizing further high-powerization, and to provide an active optical fiber having a function for allowing a pumping light to make two or more reciprocations therein.

To this end, one embodiment of an optical fiber amplifier according to the present invention comprises: a signal generating device for generating a signal having a previously set repeating frequency; a pumping light generating device for generating, based on the signal from the signal generating device, a pumping light of which central wavelength is periodically varied; an active optical fiber doped with rare earth element; a pumping light input device for inputting the pumping light output from the pumping light generating device, into one end of the active optical fiber; an optical filter of central transmission wavelength variable type inserted in an optical path leading from the pumping light generating device up to one end of the active optical fiber, the optical filter having a transmission wavelength band narrower than a wavelength variation range of the pumping light, the transmission wavelength band of the optical filter having a central transmission wavelength which is varied consistently with the central wavelength of the pumping light, based on the signal from the signal generating device; and a pumping light reflection device provided at the other end of the active optical fiber, for reflecting the pumping light and transmitting the signal light; wherein the central wavelength of the pumping light and the central transmission wavelength of the optical filter of central transmission wavelength variable type are varied such that the pumping light, which is input into the active optical fiber and then reflected by the pumping light reflection device, is reflected at least one time at the optical filter of central transmission wavelength variable type.

According to such a constitution, the pumping light of which central wavelength is periodically varied, is generated by the pumping light generating device, and is sent to the optical filter of central transmission wavelength variable type which is inserted at a pre-stage or a post-stage of the pumping light input device. The central transmission wavelength of the optical filter of central transmission wavelength variable type is periodically varied consistently with the central wavelength of pumping light, based on the signal from the signal generating device, so that the pumping light just after generation is allowed to be transmitted through the optical filter of central transmission wavelength variable type so as to be input into one end of the active optical fiber. The pumping light input into the active optical fiber is reflected by the pumping light reflection device provided at the other end of active optical fiber, and returns again to the optical filter of central transmission wavelength variable type after one reciprocation within the active optical fiber. The central transmission wavelength at this time of the optical filter of central transmission wavelength variable type has been varied to a value different from that of the central wavelength of the pumping light which has completed the one reciprocation. As such, until the central transmission wavelength of the optical filter of central transmission wavelength variable type again becomes equal to the central wavelength of the pumping light after lapse of one period, the pumping light having completed a reciprocation within the active optical fiber is reflected by the optical filter of central transmission wavelength variable type, forced to make a further reciprocation, and confined within the active optical fiber. When the pumping light reaches the optical filter of central transmission wavelength variable type just upon lapse of one period, this pumping light having an optical power decayed due to two or more reciprocations passes through the optical filter of central transmission wavelength variable type to thereby exit the active optical fiber, and a new pumping light is alternatively input into the active optical fiber by passing through the optical filter of central transmission wavelength variable type. The pumping light is thus allowed to make two or more reciprocations within the active optical fiber, so that the rare earth element is put in a pumped state with an extremely higher conversion efficiency by virtue of such pumping light. As such, upon input of signal light into the active optical fiber, the signal light is amplified by an induced emission effect, and is output to the outside while passing through the pumping light reflection device. Thus, it becomes possible to realize high-powerization of optical fiber amplifier.

As a concrete constitution of the optical fiber amplifier, the central transmission wavelength of the optical filter of central transmission wavelength variable type may be varied with an in-phase relationship and synchronously with the central wavelength of the pumping light, and particularly, the central wavelength of the pumping light and the central transmission wavelength of the optical filter of central transmission wavelength variable type are preferably set to be varied with a timewise transition in a sawtooth waveform.

The active optical fiber may be provided with an optical filter area comprising a diffraction grating of central transmission wavelength variable type arranged near the one end of the active optical fiber, the diffraction grating may have a transmission wavelength band narrower than the wavelength variation range of the pumping light, and the transmission wavelength band of the diffraction grating may have a variable central transmission wavelength, the diffraction grating may transmit the signal light, and the optical filter area may function as the optical filter of central transmission wavelength variable type. Further, it is possible that the optical filter area comprises two diffraction gratings of central reflection wavelength variable type, which are connected in series in the longitudinal direction of the optical fiber, and which have a predetermined wavelength difference between the respective central reflection wavelengths.

By utilizing such an active optical fiber, there can be removed such as insertion loss and coupling loss due to the optical filter of central transmission wavelength variable type, so that the conversion efficiency of pumping light can be further enhanced.

In addition, in the optical fiber amplifier matched to a plurality of circuits, the active optical fiber, the pumping light input device, the optical filter of central transmission wavelength variable type, and the pumping light reflection device may be provided for each of the plurality of circuits, the signal generating device may supply control signals to the pumping light generating device and to each of the optical filters of central transmission wavelength variable type, and the pumping light generating device may supply the pumping light to each of the pumping light input device.

According to such a constitution, the pumping light is allowed to make two or more reciprocations within each of the active optical fibers corresponding to the respective circuits, in an optical fiber amplifier matched to a plurality of circuits such as uplink circuit and downlink circuit. Thus, it becomes possible to simultaneously realize high-powerization of a plurality of circuits, by such an optical fiber amplifier.

Another embodiment of an optical fiber amplifier according to the present invention comprises: a signal generating device for generating a signal having a previously set repeating frequency; a pumping light generating device for generating, based on the signal from the signal generating device, a pumping light of which central wavelength is periodically varied; an active optical fiber doped with rare earth element; a pumping light input device for inputting the pumping light output from the pumping light generating device, into one end of the active optical fiber; an optical filter of central reflection wavelength variable type inserted in an optical path leading from the pumping light generating device up to one end of the active optical fiber, the optical filter having a reflection wavelength band narrower than a wavelength variation range of the pumping light, the reflection wavelength band of the optical filter having a central reflection wavelength which is varied mutually differently from the central wavelength of the pumping light, based on the signal from the signal generating device; and a pumping light reflection device provided at the other end of the active optical fiber, for reflecting the pumping light and transmitting the signal light; wherein the central wavelength of the pumping light and the central reflection wavelength of the optical filter of central reflection wavelength variable type are varied such that the pumping light, which is input into the active optical fiber and then reflected by the pumping light reflection device, is reflected one time at the optical filter of central reflection wavelength variable type.

According to such a constitution, the pumping light of which central wavelength is periodically varied, is generated by the pumping light generating device, and is sent to the optical filter of central reflection wavelength variable type which is inserted at a pre-stage or a post-stage of the pumping light input device. The central reflection wavelength of the optical filter of central reflection wavelength variable type is periodically varied mutually differently from the central wavelength of pumping light, based on the signal from the signal generating device, so that the pumping light of which central wavelength is different from the central reflection wavelength of the optical filter is allowed to be transmitted through the optical filter of central reflection wavelength variable type so as to be input into one end of the active optical fiber. The pumping light input into the active optical fiber is reflected by the pumping light reflection device provided at the other end of active optical fiber, and returns again to the optical filter of central reflection wavelength variable type after one reciprocation within the active optical fiber. The central reflection wavelength at this time of the optical filter of central reflection wavelength variable type has been varied to a value same with that of the central wavelength of the pumping light which has completed the one reciprocation. As such, the pumping light having completed a reciprocation within the active optical fiber is reflected by the optical filter of central reflection wavelength variable type, and forced to make another reciprocation within the active optical fiber. When the pumping light again reaches the optical filter of central reflection wavelength variable type, just upon lapse of one period, this pumping light having an optical power decayed due to two reciprocations passes through the optical filter of central reflection wavelength variable type to thereby exit the active optical fiber, and a new pumping light is alternatively input into the active optical fiber by passing through the optical filter of central reflection wavelength variable type. The pumping light is thus allowed to make two reciprocations within the active optical fiber, so that the rare earth element is put in a pumped state with a higher conversion efficiency by virtue of such pumping light. As such, upon input of signal light into the active optical fiber, the signal light is amplified by an induced emission effect, and is output to the outside while passing through the pumping light reflection device. Thus, it becomes possible to realize high-powerization of optical fiber amplifier.

As a concrete constitution of the optical fiber amplifier, the central reflection wavelength of the optical filter of central reflection wavelength variable type may be varied with an antiphase relationship and synchronously with the central wavelength of the pumping light. The signal generating device is to generate the signal at a repeating frequency which is equal to a reciprocal number of a time length required for the pumping light to make a reciprocation between the optical filter of central reflection wavelength variable type and the pumping light reflection device. Further, the central wavelength of the pumping light and the central reflection wavelength of the optical filter of central reflection wavelength variable type are preferably varied with a timewise transition in a rectangular waveform or sine waveform.

Furthermore, the active optical fiber may be provided with an optical filter area comprising a diffraction grating of central reflection wavelength variable type arranged near the one end of the active optical fiber, the diffraction grating may have a reflection wavelength band narrower than the wavelength variation range of the pumping light, the reflection wavelength band of the diffraction grating may have a variable central reflection wavelength, the diffraction grating may transmit the signal light, and the optical filter area may function as the optical filter of central reflection wavelength variable type.

By utilizing such an active optical fiber, there can be removed such as insertion loss and coupling loss of the optical filter of central reflection wavelength variable type, so that the conversion efficiency of the pumping light can be further enhanced.

Moreover, in an optical fiber amplifier matched to a plurality of circuits, the active optical fiber, the pumping light input device, the optical filter of central reflection wavelength variable type, and the pumping light reflection device may be provided for each of the plurality of circuits, the signal generating device may supply control signals to the pumping light generating device and to each of the optical filters of central reflection wavelength variable type, and the pumping light generating device may supply the pumping light to each of the pumping light input device.

According to such a constitution, the pumping light is allowed to make two reciprocations within each of the active optical fibers corresponding to the respective circuits, in an optical fiber amplifier matched to a plurality of circuits such as uplink circuit and downlink circuit. Thus, it becomes possible to simultaneously realize high-powerization of a plurality of circuits, by such an optical fiber amplifier.

In the aforementioned embodiments of optical fiber amplifiers, it is possible to adopt one of the following four constitutions, as a concrete one for the pumping light generating device. As a first constitution, the pumping light generating device shall comprise a pumping light source for generating pumping light, and a pumping light wavelength modulation circuit for modulating a central wavelength of the pumping light generated by the pumping light source, based on the signal from the signal generating device.

As a second constitution, the pumping light generating device shall comprise a plurality of pumping light sources for generating pumping lights of which central wavelengths are different from one another, an optical switch capable of being input with the pumping lights from each of the pumping light sources, and of selecting at least one of the pumping lights to thereby output the same, and an optical switch driving circuit for generating a driving signal for driving the optical switch, based on the signal from the signal generating device.

As a third constitution, the pumping light generating device shall comprise a plurality of pumping light sources for generating pumping lights of which central wavelengths are different from one another, a pumping light source driving circuit for controlling driving states of each of the pumping light sources, based on the signal from the signal generating device, and an optical coupler, which is input with each of the pumping lights and outputs the same to the pumping light input device.

As a fourth constitution, the pumping light generating device shall comprise two pumping light sources, each of which is adapted to generate two pumping lights having central wavelengths different from each other, a pumping light source driving circuit for controlling driving states of each of the pumping light sources, based on the signal from the signal generating device, and a wavelength-division multiplexing coupler, which is input with the pumping lights from each of the pumping light sources and multiplexes wavelengths of the pumping lights to thereby output them to the pumping light input device.

Further, in the aforementioned embodiments of optical fiber amplifiers, the active optical fiber may be provided with a pumping light reflection area comprising a diffraction grating arranged near the other end of the active optical fiber, the diffraction grating may reflect the pumping light and transmit the signal light, and the pumping light reflection area may function as the pumping light reflection device. By utilizing such an active optical fiber, it becomes possible to remove such as insertion loss and coupling loss of the light reflection device, to thereby further enhance the conversion efficiency of pumping light.

As a concrete setting for the signal generating device, the repeating frequency thereof is preferably in a range from 100 kHz to 100 MHz.

As one embodiment of active optical fiber according to the present invention, the active optical fiber is doped with a rare earth element, and comprises: an optical filter area comprising a diffraction grating of central transmission wavelength variable type arranged near one end of the active optical fiber, the diffraction grating having a transmission wavelength band narrower than a wavelength variation range of input pumping light, the transmission wavelength band of the diffraction grating having a variable central transmission wavelength, the diffraction grating transmitting the signal light; and a pumping light reflection area comprising a diffraction grating arranged near the other end of the active optical fiber, the diffraction grating being adapted to reflect the pumping light and to transmit the signal light.

As another embodiment of active optical fiber according to the present invention, the active optical fiber is doped with a rare earth element, and comprises: an optical filter area comprising a diffraction grating of central reflection wavelength variable type arranged near one end of the active optical fiber, the diffraction grating having a reflection wavelength band narrower than a wavelength variation range of input pumping light, the reflection wavelength band of the diffraction grating having a variable central reflection wavelength, the diffraction grating transmitting signal light; and a pumping light reflection area comprising a diffraction grating arranged near the other end of the active optical fiber, the diffraction grating being adapted to reflect the pumping light and to transmit the signal light.

Also in each of the embodiments of active optical fiber, there is provided a fiber structure in which the input pumping light is allowed to make reciprocations between the optical filter area and the pumping light reflection area, thereby enabling realization of improvement in conversion efficiency of pumping light.

Further objects, features and advantages of the present invention will become more apparent from the following description of preferred embodiments when read in conjunction with the accompanying drawings.

DETAILED DESCRIPTION OF THE INVENTION

There will be described hereinafter the embodiments according the present invention, with reference to the accompanying drawings.

Figure 1:
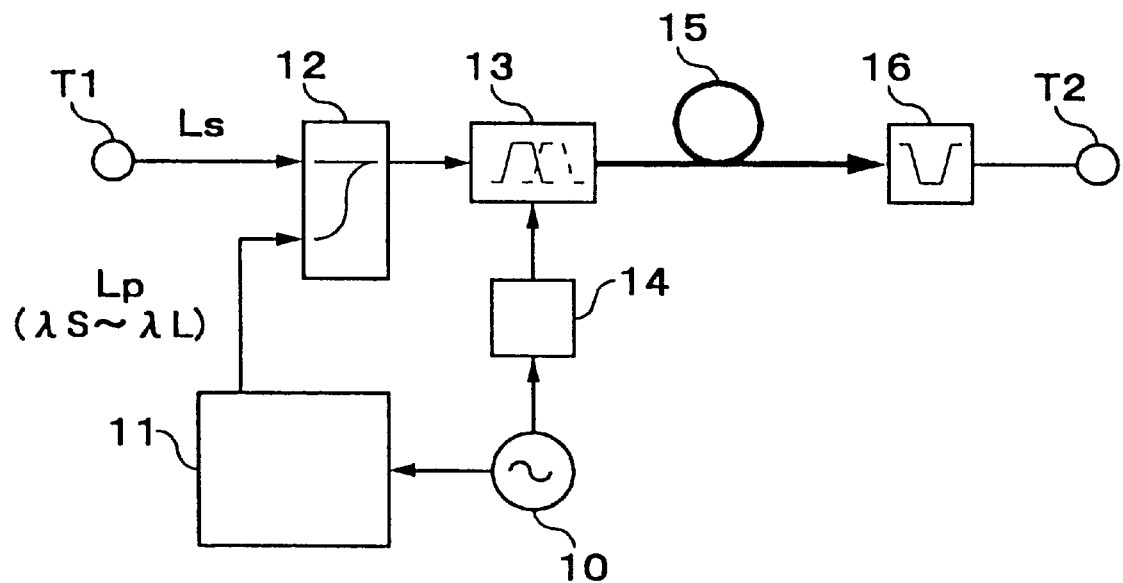
FIG. 1 is a constitutional view of an optical fiber amplifier according to a first embodiment showing a basic constitution of the present invention.

FIG. 1 is a constitutional view of an optical fiber amplifier according to a first embodiment, showing a basic constitution of the present invention.

In FIG. 1, the optical fiber amplifier of the present invention is constituted to comprise: an oscillator 10 as signal generating device which oscillates a signal at a repeating frequency fo; a pumping light generating part 11 as pumping light generating device, which is input with the signal from the oscillator 10 and generates a pumping light Lp of which central wavelength periodically varies; a multiplexer 12 as pumping light input device for multiplexing the pumping light Lp from the pumping light generating part 11 and a signal light Ls from an input terminal T1, and for outputting them; an optical filter 13 having a variable central transmission wavelength which is input with the light output from the multiplexer 12; a central transmission wavelength modulation circuit 14 which is input with an output signal from the oscillator 10, and generates a control signal for varying the central transmission wavelength of the optical filter 13; an active optical fiber 15 input, at one end thereof, with the output light of the optical filter 13; and an optical reflector 16 as pumping light reflection device coupled between the other end of active optical fiber 15 and an output terminal T2. In this case, there is realized a function of optical filter of central transmission wavelength variable type, cooperatively by the optical filter 13 and central transmission wavelength modulation circuit 14.

The pumping light generating part 11 generates the pumping light Lp, of which central wavelength periodically varies in a range from $\lambda S$ to $\lambda L$ in response to an electric signal of the repeating frequency fo output from the oscillator 10. Preferably, the repeating frequency fo is set to be in a range such as from 100 kHz to 100 MHz, in consideration of a time length required for the signal light Ls to pass through the active optical fiber 15.

Figure 2:
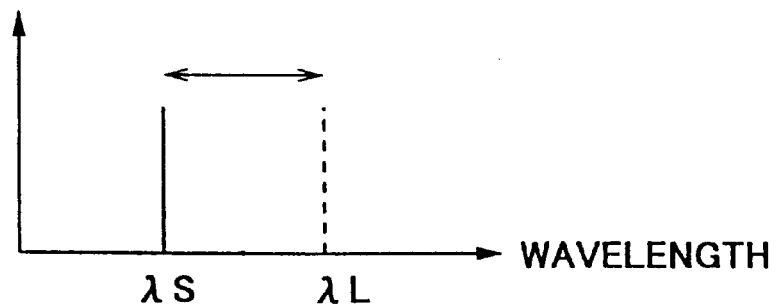
FIG. 2 is a diagram showing a spectrum of pumping light central wavelength component of the first embodiment.
Figure 3:
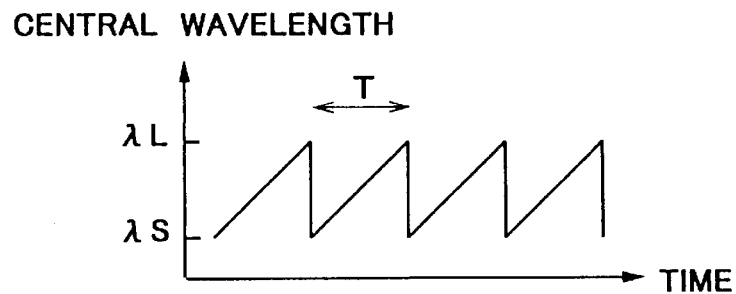
FIG. 3 is a diagram showing a timewise transition of the pumping light central wavelength in the first embodiment.

FIG. 2 shows a spectrum of the central wavelength component of the pumping light Lp, and FIG. 3 shows a timewise transition of the central wavelength of pumping light Lp. As shown, the central wavelength of pumping light Lp is assumed to exhibit a timewise transition in a sawtooth waveform. Namely, the central wavelength of pumping light Lp repeats a sequence of variation in a period T, such that the central wavelength increases from the wavelength $\lambda S$ with a predetermined gradient, and upon reaching the wavelength $\lambda L$, the central wavelength instantaneously returns to the wavelength $\lambda S$. As will be described later, this period T is suitably established depending on the number of times of reciprocations for the pumping light Lp confined within the active optical fiber 15, and depending on the time length required for the reciprocations. Further, as the wavelength band of pumping light Lp, there shall be adopted a general one, such as 0.98 $\mu$m band or 1.48 $\mu$m band.

Figure 4:
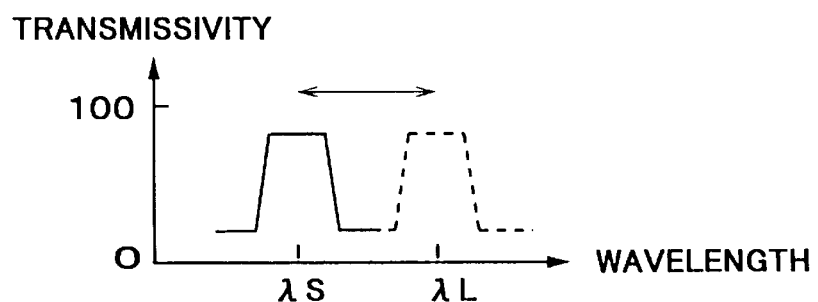
FIG. 4 is a diagram showing a transmission characteristic of an optical filter in the first embodiment.
Figure 5:
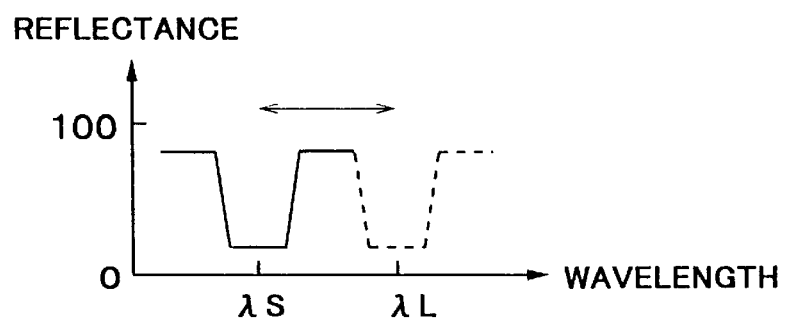
FIG. 5 is a diagram showing a reflection characteristic of the optical filter in the first embodiment.

The optical filter 13 has such a characteristic to transmit those lights in the wavelength band of the signal light Ls, and, with respect to the wavelength band of pumping light Lp, to transmit those pumping lights Lp in a predetermined wavelength range and to reflect those pumping lights Lp having wavelength outside the predetermined wavelength range. Here, it is assumed that: the central value of the predetermined wavelength range (transmission wavelength band), in which the pumping light Lp is transmitted, be the central transmission wavelength $\lambda t$ of the optical filter 13; and this central transmission wavelength $\lambda t$ shall be varied in accordance with the control signal generated from the central transmission wavelength modulation circuit 14, in response to the electric signal from the oscillator 10. Shown in FIGS. 4 and 5 are transmissivity and reflectance of the optical filter 13 with respect to the wavelength band of pumping light Lp, respectively. As shown, the central transmission wavelength $\lambda t$ of optical filter 13 varies between wavelength $\lambda S$ and wavelength $\lambda L$, and the timewise transition of $\lambda t$ shall have an in-phase relationship and be synchronized with the timewise transition (sawtooth waveform) of the central wavelength of pumping light Lp shown in FIG. 3.

The active optical fiber 15 is a common fiber doped with a rare earth element such as Erbium. In this active optical fiber 15, the doped rare earth element is pumped by the pumping light Lp, and the signal light Ls is amplified by the induced emission action of the pumped rare earth element.

The optical reflector 16 has such a characteristic to transmit the signal light Ls and to reflect the pumping light Lp. This optical reflector 16 is identical with the optical reflector 4 added to the aforementioned conventional optical fiber amplifier, so that the reflector 16 reflects the pumping light Lp output from the pumping light generating part 11 at every wavelength.

There will be described hereinafter the operation of the first embodiment.

Upon actuation of the present optical fiber amplifier, the electric signal at the repeating frequency fo is output from the oscillator 10 to the pumping light generating part 11 and to the central transmission wavelength modulation circuit 14. In response to this electric signal from the oscillator 10, the pumping light generating part 11 generates the pumping light Lp of which central wavelength periodically are varied, and the central transmission wavelength modulation circuit 14 generates the control signal for periodically varying the central transmission wavelength $\lambda t$ of optical filter 13. The pumping light Lp generated by the pumping light generating part 11 is sent to the optical filter 13 via the multiplexer 12. At the optical filter 13, the central transmission wavelength $\lambda t$ is controlled by the control signal from the central transmission wavelength modulation circuit 14. As such, there will consistently vary the central wavelength of pumping light Lp and the central transmission wavelength $\lambda t$ of optical filter 13, with each other, so that the pumping light Lp is rendered to make two or more reciprocations within the active optical fiber 15.

There will be concretely explained hereinafter the operation during one period T, with reference to FIGS. 6 and 7.

Figure 6:
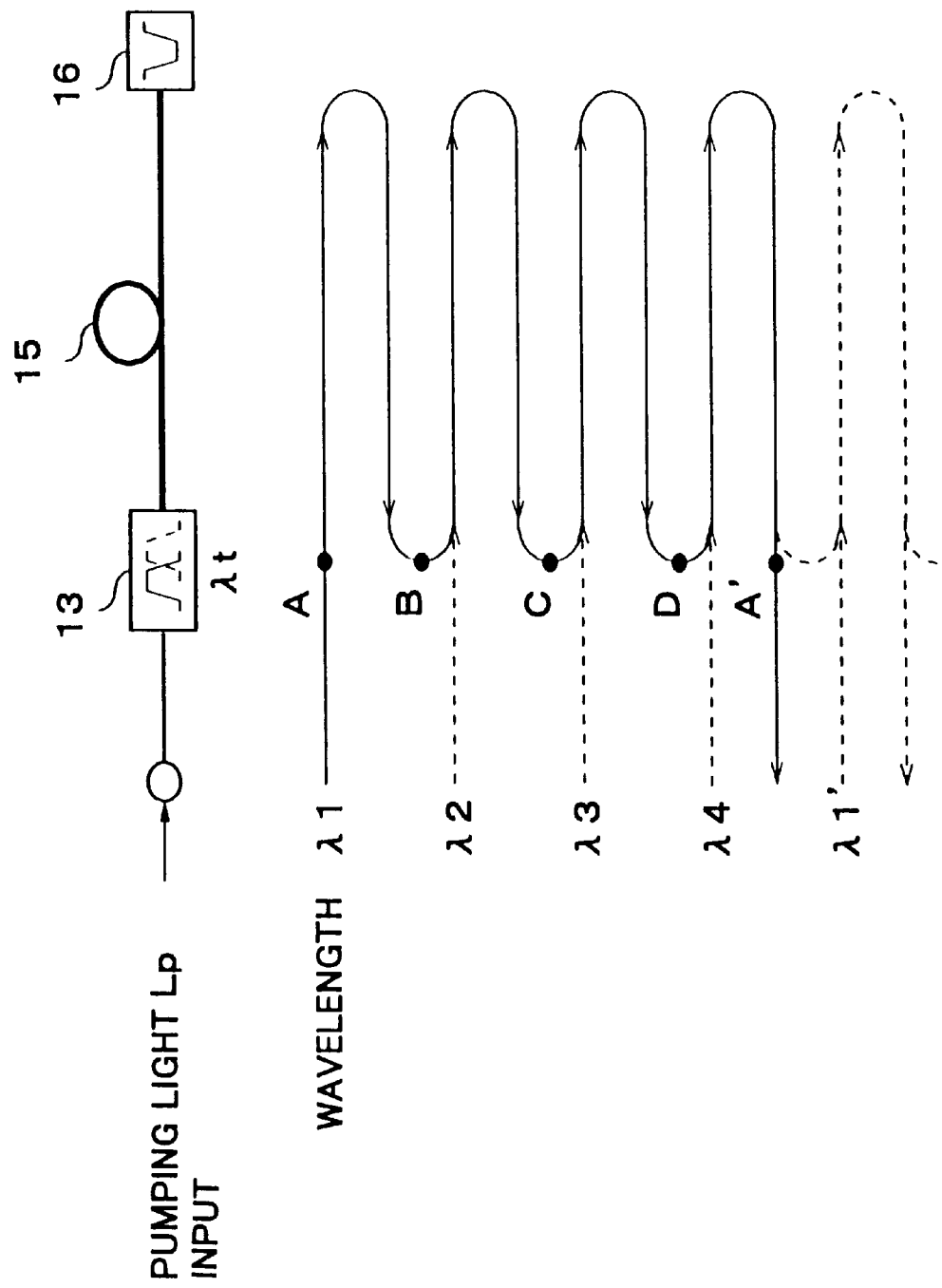
FIG. 6 is a first explanatory view showing an operation during one period in the first embodiment.

There is firstly considered one period during which the central wavelength of pumping light Lp varies from a certain wavelength $\lambda 1$ to the same wavelength $\lambda 1'$, as shown by a solid line in FIG. 6. Further, it is assumed that: the time point, at which the pumping light Lp of central wavelength $\lambda 1$ is input into the optical filter 13, be A; and the time point, at which the thus input pumping light Lp has returned to the optical filter 13 after being transmitted through this optical filter 13 and then being reflected by the optical reflector 16, i.e., the time point at which the pumping light Lp has just completed one reciprocation within the active optical fiber 15, be B. It is further assumed, in a similar manner, that: the time points at which the pumping light Lp of central wavelength $\lambda 1$ has completed two, three and four reciprocations within the active optical fiber 15, be C, D, and A', respectively; and at the fourth time point A', one period or one cycle has just lapsed. Further, the central wavelength of pumping light Lp at the time points B, C and D, is assumed to be $\lambda 2$, $\lambda 3$, and $\lambda 4$, respectively.

Figure 7:
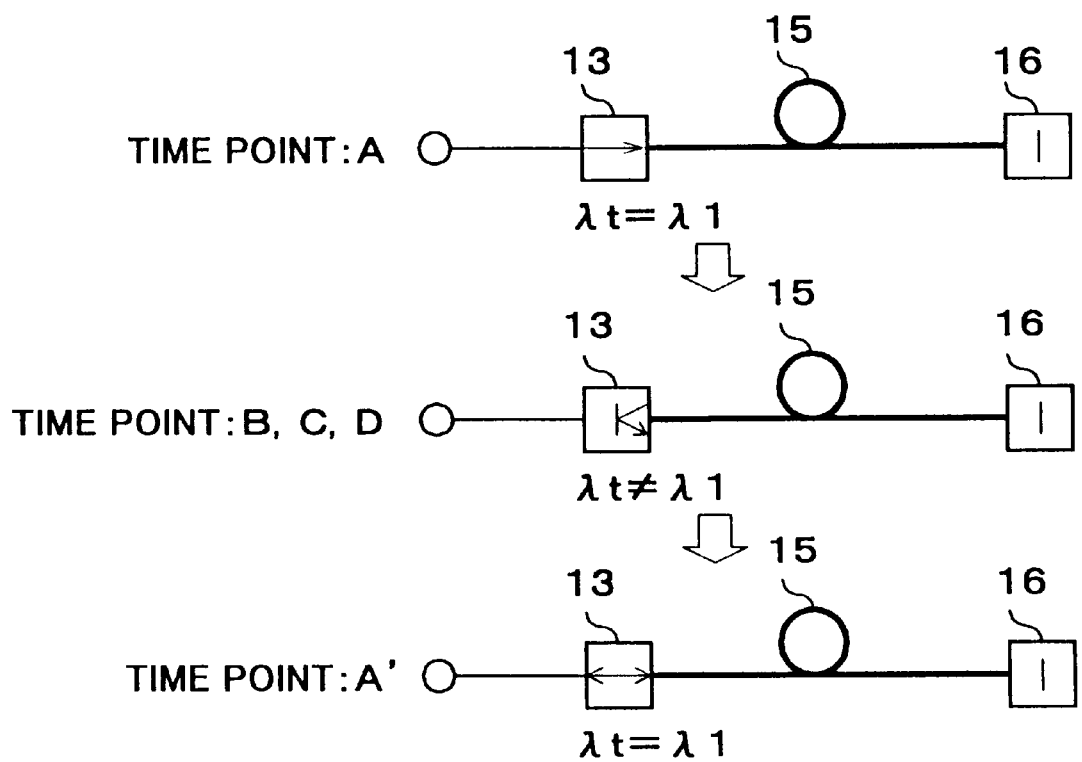
FIG. 7 is a second explanatory view showing the operation during one period in the first embodiment.

At the time point A, the central transmission wavelength $\lambda t$ of optical filter 13 becomes the wavelength $\lambda 1$, as shown at the upper stage of FIG. 7, so that the pumping light Lp of central wavelength $\lambda 1$ passes through the optical filter 13 and is then input into one end of the active optical fiber 15. As shown in FIG. 6, this pumping light Lp of central wavelength $\lambda 1$ is propagated within active optical fiber 15, is reflected by the optical reflector 16, and is propagated in the reverse direction within the active optical fiber 15 up to the optical filter 13.

At the time point B, the central transmission wavelength $\lambda t$ of optical filter 13 becomes the central wavelength $\lambda 2$, as shown at the middle stage of FIG. 7, so that the pumping light Lp of central wavelength $\lambda 1$, which has made one reciprocation within the active optical fiber 15, is reflected by the optical filter 13, and makes another reciprocation within the active optical fiber 15. It is noted that, at this time, the pumping light Lp of central wavelength λ2 is input into one end of the active optical fiber 15, after passing through the optical filter 13, as shown by a dotted line of FIG. 6. Also, at the time points C and D, the central transmission wavelength λt of optical filter 13 becomes wavelength λ3 and λ4, respectively, so that the reciprocating pumping light Lp of central wavelength λ1 is reflected by the optical filter 13 at both time points C and D, respectively, similarly to the case of the time point B, and makes another reciprocation within the active optical fiber 15, respectively.

At the time point A', the central transmission wavelength λt of optical filter 13 becomes the wavelength λ1 as shown at the lower stage of FIG. 7, so that the pumping light Lp of central wavelength λ1, which has completed four reciprocations within the active optical fiber 15, passes through the optical filter 13 and then advances towards the multiplexer 12. Concurrently therewith, newly supplied pumping light Lp of central wavelength λ1 passes through the optical filter 13, and then is input into one end of the active optical fiber 15. As such, the pumping light Lp of central wavelength λ1, which has completed four reciprocations within the active optical fiber 15 and thus has its decayed optical power, is replaced with the new pumping light Lp having sufficient optical power.

As described above, once the pumping light Lp of certain central wavelength is input into the active optical fiber 15, this pumping light Lp is allowed to make four reciprocations within the active optical fiber 15 during the lapse of the aforementioned period T, so that the conversion efficiency of pumping light can be drastically enhanced. According to simple calculation, approximately 75% of power of input pumping light is utilized for pumping of rare earth element when the pumping light Lp makes two reciprocations within the active optical fiber, and so are approximately 87% and approximately 94% for three and four reciprocations, respectively.

After input of the signal light Ls from the input terminal T1, via the multiplexer 12 and the optical filter 13, into the active optical fiber 15 which is put into an pumped state with a higher conversion efficiency as described above, the signal light Ls is amplified by an induced emission effect, during being propagated through the active optical fiber 15, passes through the optical reflector 16, and is finally output outwardly from the output terminal T2.

In the first embodiment presenting a basic constitution of the present invention, there is provided the optical filter 13 having variable central transmission wavelength at one end of the active optical fiber 15, and the central transmission wavelength λt of this optical filter 13 and the central wavelength of pumping light Lp are periodically varied in a manner consistent with each other. As such, the pumping light Lp once input into the active optical fiber 15 is confined within the active optical fiber 15 during lapse of one period T, and in this case, the pumping light Lp is allowed to make four reciprocations within the active optical fiber 15. Thus, the conversion efficiency of pumping light can be remarkably enhanced, thereby enabling high-powerization of the optical fiber amplifier.

Although explained in the first embodiment is such a case that the pumping light Lp makes four reciprocations within the active optical fiber 15, the number of times of reciprocations to be made by the pumping light is not limited thereto. By setting the period T such as to allow appropriate number of times of reciprocations, to be more than two, there can be attained a conversion efficiency higher than the conventional optical fiber amplifier.

Figure 8:
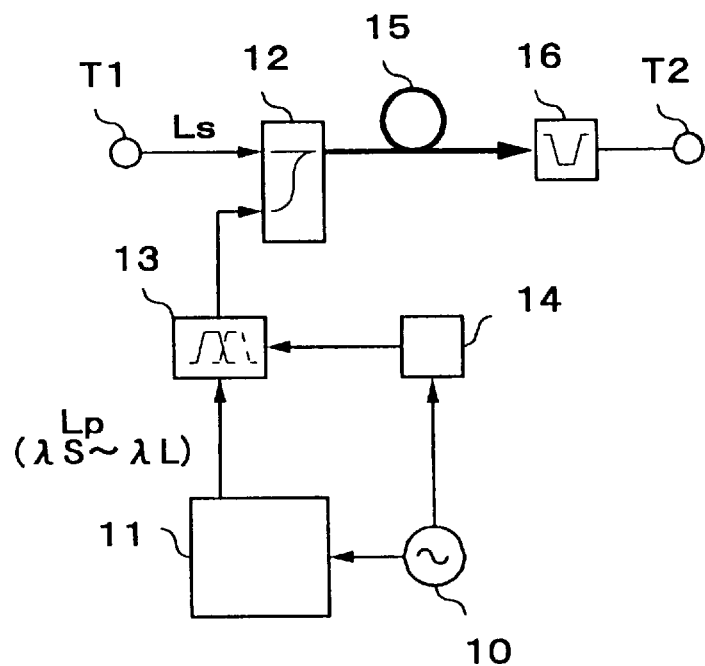
FIG. 8 is a constitutional view of another example of the first embodiment.

Although the optical filter 13 has been constituted to be coupled between the output terminal of the multiplexer 12 and one end of the active optical fiber 15, this optical filter 13 may be coupled between the output terminal of the pumping light generating part 11 and a pumping light input end of the multiplexer 12, as shown in FIG. 8. Only, in this case, the pumping light Lp makes two or more reciprocations, within both of the multiplexer 12 and active optical fiber 15. If the loss of pumping light Lp due to passage through the multiplexer 12 may affect the pumping efficiency, it is thus advisable to arrange the optical filter 13 between the multiplexer 12 and the active optical fiber 15.

There will be described hereinafter a second embodiment presenting another basic constitution of the present invention.

Figure 9:
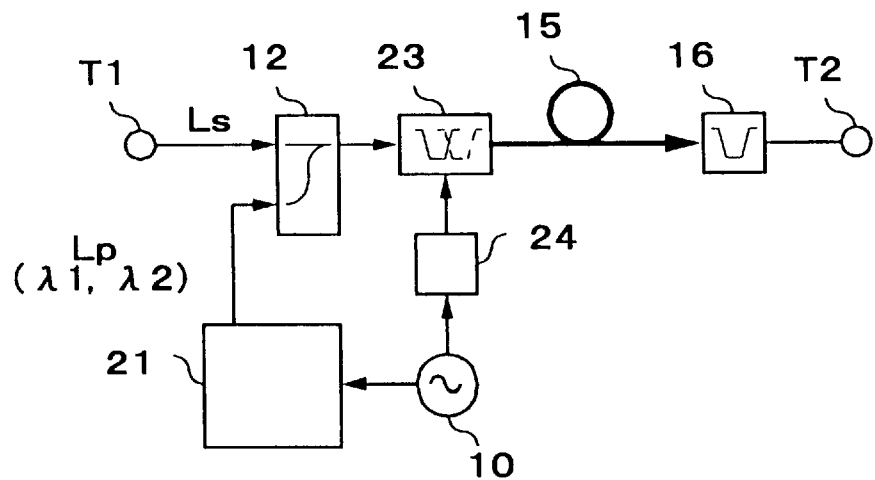
FIG. 9 is a constitutional view of an optical fiber amplifier according to a second embodiment showing another basic constitution of the present invention.

FIG. 9 is a constitutional view of an optical fiber amplifier according to the second embodiment. Those parts identical with the constitution of the first embodiment are designated by the identical numerals, and their explanation shall be omitted.

In FIG. 9, the present optical fiber amplifier is characterized in that the same is provided with an optical filter 23 having a variable central reflection wavelength, in place of the optical filter 13 having the variable central transmission wavelength adopted in the first embodiment. Correspondingly to the replacement of the optical filter, there are adopted a pumping light generating part 21 and a central reflection wavelength modulation circuit 24, in place of the pumping light generating part 11 and central transmission wavelength modulation circuit 14 adopted in the first embodiment. The constitutions other than the above are identical with those of the first embodiment.

Figure 10:
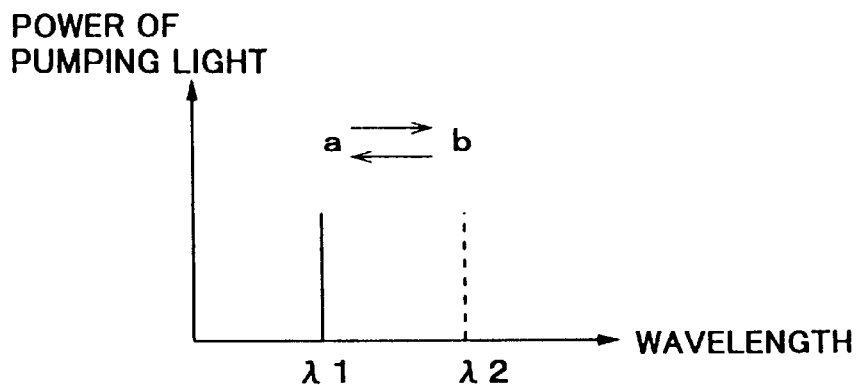
FIG. 10 is a diagram showing a spectrum of pumping light central wavelength component of the second embodiment.
Figure 11:
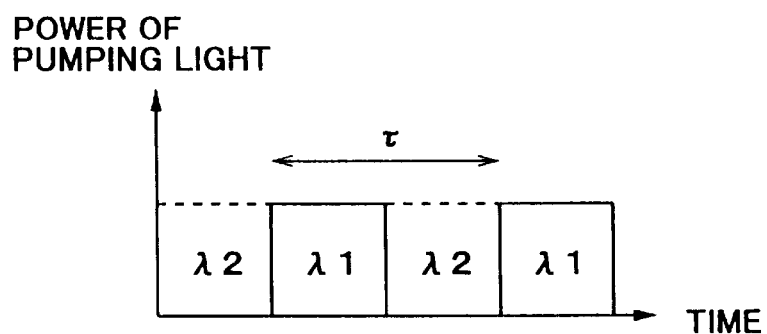
FIG. 11 is a diagram showing a timewise transition of the pumping light central wavelength in the second embodiment.

The pumping light generating part 21 generates the pumping light Lp of which central wavelength are periodically varied either to λ1 or λ2, in response to the electric signal of repeating frequency fo to be output by the oscillator 10. FIG. 10 shows a spectrum of central wavelength component of pumping light Lp, and FIG. 11 shows a timewise transition of central wavelength of pumping light. As shown, the central wavelength of pumping light Lp shall alternately repeat λ1 and λ2 with a period τ. Although the timewise transition of central wavelength is shown in a rectangular waveform here, a sine waveform may be used. As will be described later, this period τ is suitably established depending on the time length required for two reciprocations of the pumping light Lp within the active optical fiber 15. Further, as the wavelength band of pumping light Lp, there shall be adopted a general one, such as 0.98 μm band or 1.48 μm band.

Figure 12:
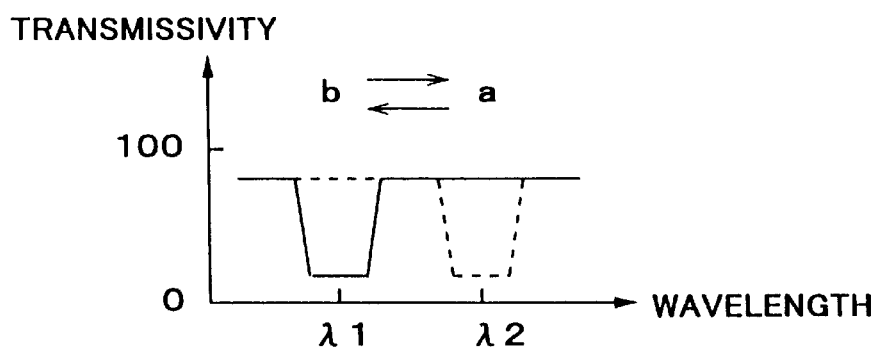
FIG. 12 is a diagram showing a transmission characteristic of an optical filter in the second embodiment.
Figure 13:
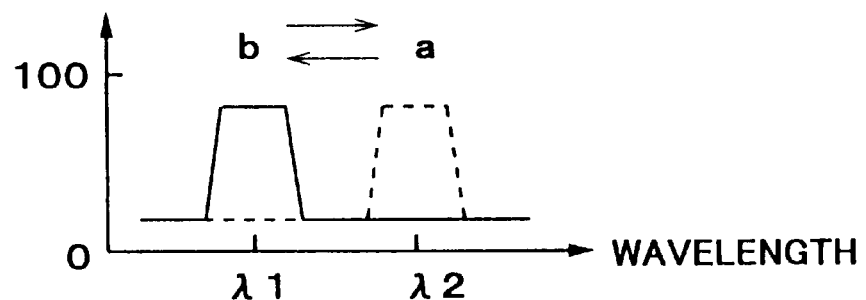
FIG. 13 is a diagram showing a reflection characteristic of an optical filter in the second embodiment.

The optical filter 23 has such a characteristic to transmit those lights in the wavelength band of the signal light Ls, and, with respect to the wavelength band of pumping light Lp, to reflect those pumping lights Lp in a predetermined wavelength range and to transmit those pumping lights Lp having wavelength outside or other than the predetermined wavelength range. Here, it is assumed that: the central value of the predetermined wavelength range (reflection wavelength band), in which the pumping light Lp is reflected, be the central reflection wavelength λr of the optical filter 23; and this central reflection wavelength λr shall be varied in accordance with the control signal generated from the central reflection wavelength modulation circuit 24, in response to the electric signal from the oscillator 10. Shown in FIGS. 12 and 13 are transmissivity and reflectance of the optical filter 23 with respect to the wavelength band of pumping light Lp, respectively. As shown, the central reflection wavelength λr of optical filter 23 alternately varies between wavelength λ1 and wavelength λ2, and the timewise transition of λr shall have an antiphase relationship and be synchronized with the timewise transition of the central wavelength of pumping light Lp shown in FIG. 11.

There will be described hereinafter the operation of the second embodiment.

Upon actuation of the present optical fiber amplifier, the electric signal at the repeating frequency fo is output from the oscillator 10 to the pumping light generating part 21 and to the central reflection wavelength modulation circuit 24. In response to this electric signal from the oscillator 10, the pumping light generating part 21 generates the pumping light Lp of which central wavelength is alternately varied between wavelength λ1 and wavelength λ2, and the central reflection wavelength modulation circuit 24 generates the control signal for periodically varying the central reflection wavelength λr of optical filter 23. The pumping light Lp generated by the pumping light generating part 21 is sent to the optical filter 23 via the multiplexer 12. At the optical filter 23, the central reflection wavelength λr is controlled by the control signal from the central reflection wavelength modulation circuit 24. As such, there will vary the central wavelength of pumping light Lp and the central reflection wavelength λr of optical filter 23, in an antiphase relationship and synchronously with each other, so that the pumping light Lp is rendered to make two reciprocations within the active optical fiber 15.

There will be concretely explained hereinafter the operation during one period τ with reference to FIGS. 14 and 15.

Figure 14:
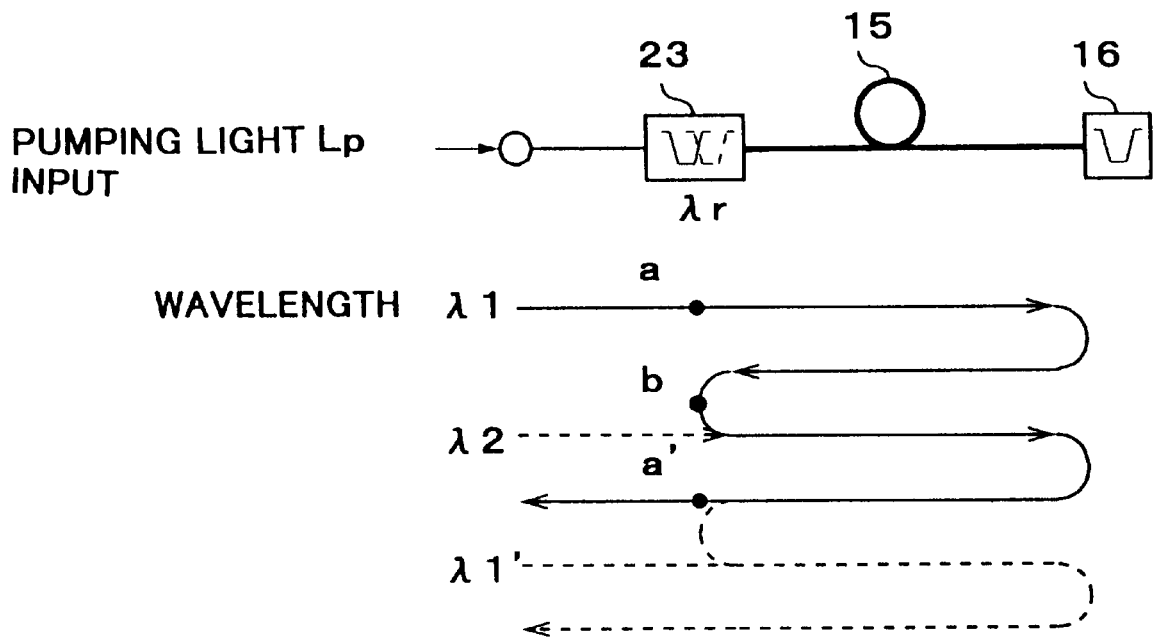
FIG. 14 is a first explanatory view showing an operation during one period in the second embodiment.

There is firstly considered one period during which the central wavelength of pumping light Lp varies from the wavelength λ1 to the same wavelength λ1', as shown by a solid line in FIG. 14. Further, it is assumed that: the time point, at which the pumping light Lp of central wavelength λ1 is input into the optical filter 23, be a; and the time point, at which the thus input pumping light Lp has returned to the optical filter 23 after being transmitted through this optical filter 23 and then being reflected by the optical reflector 16, i.e., the time point at which the pumping light Lp has just completed one reciprocation within the active optical fiber 15, be b. The central wavelength of pumping light Lp at this time point b is λ2. It is further assumed, in a similar manner, that: the time point at which the pumping light Lp of central wavelength λ1 has completed two reciprocations within the active optical fiber 15, be a'; and at this time point a', one period shall have just lapsed.

Figure 15:
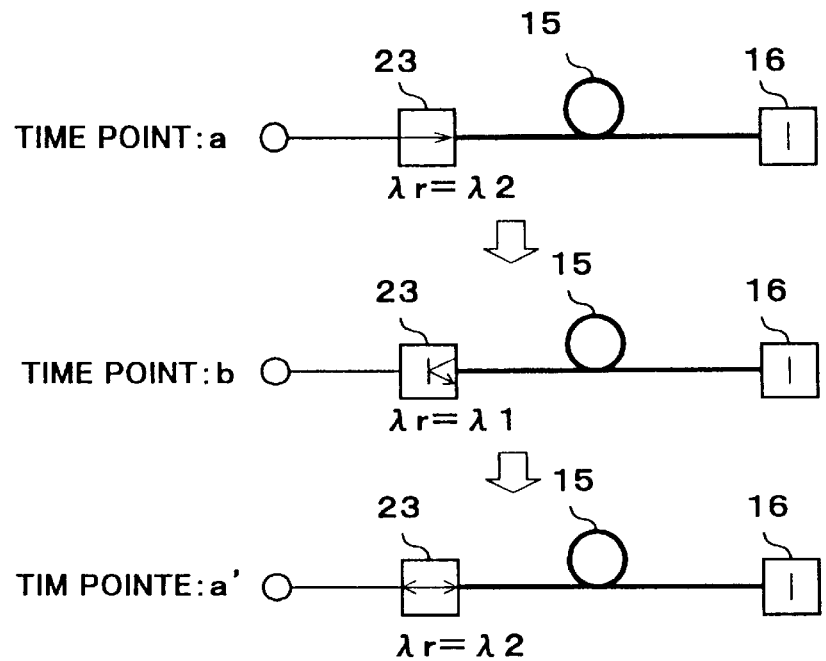
FIG. 15 is a second explanatory view showing the operation during one period in the second embodiment.

At the time point a, the central reflection wavelength λr of optical filter 23 becomes the wavelength λ2, as shown at the upper stage of FIG. 15, so that the pumping light Lp of central wavelength λ1 passes through the optical filter 23 and is then input into one end of the active optical fiber 15. As shown in FIG. 14, the pumping light Lp of central wavelength λ1 is propagated within the active optical fiber 15, is reflected by the optical reflector 16, and is propagated in the reverse direction within the active optical fiber 15 up to the optical filter 23.

At the time point b, the central reflection wavelength λr of optical filter 23 becomes the central wavelength λ1, as shown at the middle stage of FIG. 15, so that the pumping light Lp of central wavelength λ1, which has made one reciprocation within the active optical fiber 15, is reflected by the optical filter 23, makes another reciprocation within the active optical fiber 15. It is noted that, at this time, the pumping light Lp of central wavelength λ2 is input into the active optical fiber 15, after passing through the optical filter 23, as shown by a dotted line of FIG. 14.

At the time point a', the central reflection wavelength λr of optical filter 23 becomes the wavelength λ2 as shown at the lower stage of FIG. 15, so that the pumping light Lp of central wavelength λ1, which has completed two reciprocations within the active optical fiber 15, passes through the optical filter 23 and then advances towards the multiplexer 12. Concurrently therewith, a newly supplied pumping light Lp of central wavelength λ1 passes through the optical filter 23, and then is input into one end of the active optical fiber 15. As such, the pumping light Lp of central wavelength λ1, which has completed two reciprocations within the active optical fiber 15 and thus has its decayed optical power, is replaced with the new pumping light Lp having sufficient optical power.

As described above, once the pumping light Lp of either of central wavelength λ1 or λ2 is input into the active optical fiber 15, this pumping light Lp is allowed to make two reciprocations within the active optical fiber 15 during the lapse of the aforementioned period τ, so that the conversion efficiency of pumping light can be enhanced to such an extent that approximately 75% of power of input pumping light is utilized for pumping of rare earth element. After input of the signal light Ls into the active optical fiber 15 which is put into a pumped state with a higher conversion efficiency, the signal light Ls is amplified by an induced emission effect, during passing through the active optical fiber 15, passes through the optical reflector 16, and is finally output outwardly from the output terminal T2.

In the second embodiment presenting another basic constitution of the present invention, there is provided the optical filter 23 having variable central reflection wavelength at one end of the active optical fiber 15, and the central reflection wavelength λr of this optical filter 23 and the central wavelength of pumping light Lp are periodically varied in an antiphase relationship and synchronously with each other. As such, the pumping light Lp once input into the active optical fiber 15 is allowed to make two reciprocations within the active optical fiber 15. Thus, the conversion efficiency of pumping light can be enhanced, thereby enabling high-powerization of the optical fiber amplifier.

Figure 16:
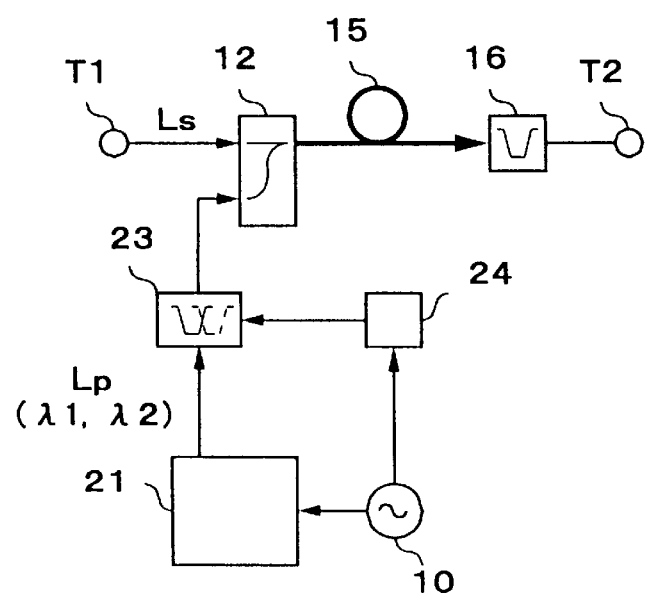
FIG. 16 is a constitutional view of another example of the second embodiment.

Although the optical filter 23 is constituted to be coupled between the output terminal of the multiplexer 12 and one end of the active optical fiber 15 in the second embodiment, this optical filter 23 may be coupled between the output terminal of the pumping light generating part 21 and a pumping light input end of the multiplexer 12, as shown in FIG. 16. Also in this case, if the loss of pumping light Lp due to passage through the multiplexer 12 may affect the pumping efficiency, it is advisable to arrange the optical filter 23 between the multiplexer 12 and the active optical fiber 15, as mentioned above.

There will be described hereinafter those embodiments representing concrete constitution of the present invention.

Firstly, there will be considered a third embodiment in which the basic constitution of the aforementioned first embodiment is matched to each of an uplink circuit and a downlink circuit.

Figure 17:
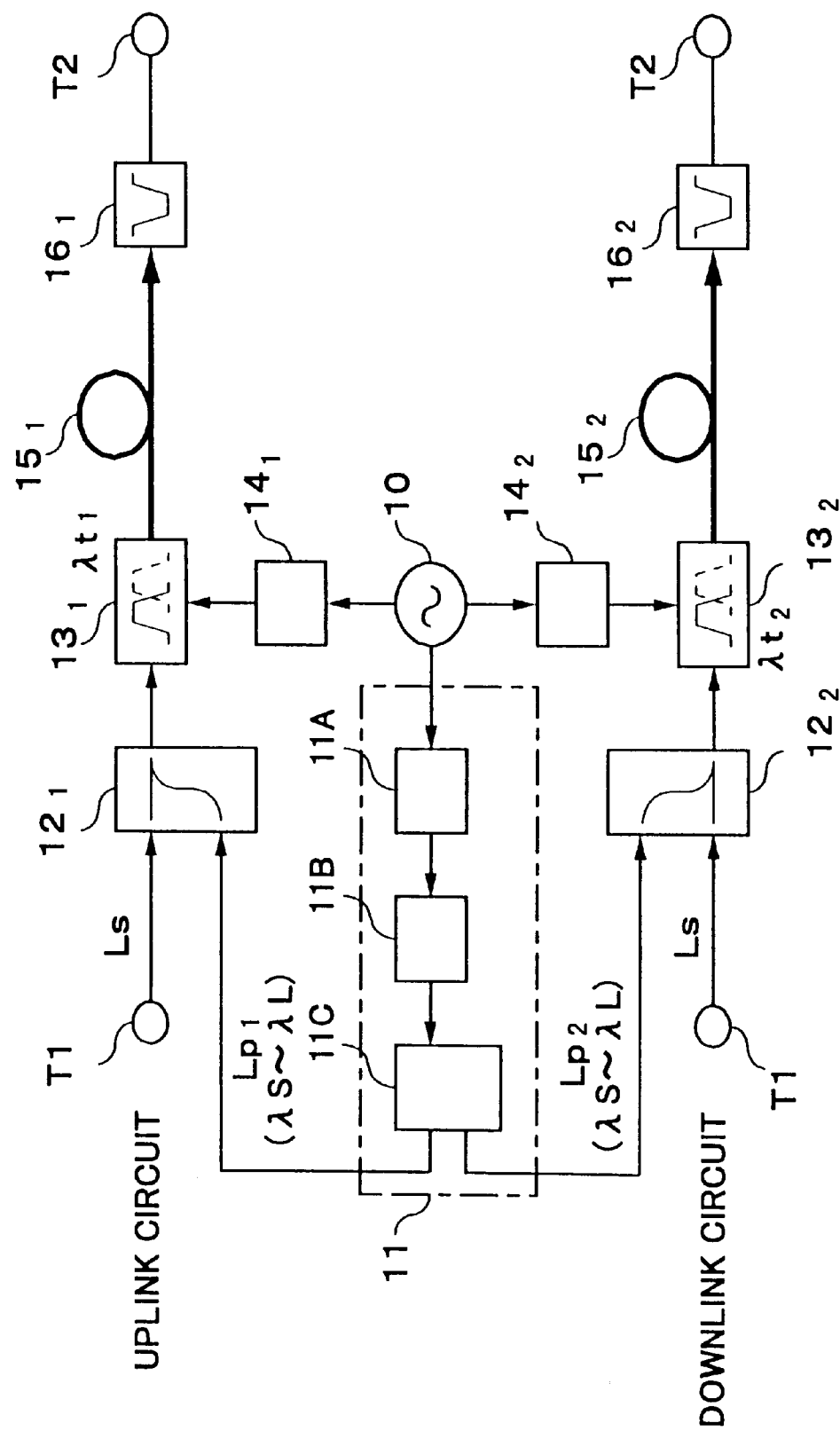
FIG. 17 is a constitutional view of a third embodiment of the present invention.

FIG. 17 is a constitutional view of an optical fiber amplifier according to the third embodiment.

In FIG. 17, the present optical fiber amplifier is obtained basically by combining two sets of the aforementioned basic constitution adopting the optical filters having variable central transmission wavelength, matchedly to an uplink circuit and a downlink circuit, respectively. Concretely, there are provided: as constitution common to the uplink circuit and downlink circuit, the oscillator 10 and the pumping light generating part 11; as constitution matched to the uplink circuit, a multiplexer $12_1$, an optical filter $13_1$, a central transmission wavelength modulation circuit $14_1$, an active optical fiber $15_1$ and an optical reflector $16_1$; and as constitution matched to the downlink circuit, a multiplexer $12_2$, an optical filter $13_2$, a central transmission wavelength modulation circuit $14_2$, an active optical fiber $15_2$ and an optical reflector $16_2$.

Further, the pumping light generating part 11 is provided such as with a pumping light wavelength modulation circuit 11A, a pumping light source 11B, and an optical coupler 11C. The pumping light-wavelength modulation circuit 11A generates a control signal for varying the central wavelength of the pumping light Lp generated by the pumping light source 11B, into a sawtooth waveform as shown in the aforementioned FIG. 3, in response to a signal from the oscillator 10. According to this control signal, the pumping light source 11B generates the pumping light Lp of which central wavelength is varied from $\lambda S$ to $\lambda L$ in a period T. This pumping light Lp is divided by the optical coupler 11C into a pumping light $Lp_1$ and a pumping light $LP_2$ which are sent to the multiplexer $12_1$ of the uplink circuit and the multiplexer $12_2$ of the downlink circuit, respectively.

In the optical fiber amplifier having such a constitution, there is conducted the operation identical to the aforementioned first embodiment, in each of the uplink circuit and downlink circuit. Namely, each of the central transmission wavelengths $\lambda t_1$ and $\lambda t_2$ of optical filters $13_1$ and $13_2$ varies consistently with the central wavelength of the respective pumping light $Lp_1$ and $LP_2$ generated at the pumping light generating part 11, so that the pumping lights $Lp_1$ and $LP_2$ are allowed to make two or more reciprocations within the active optical fibers $15_1$ and $15_2$, respectively. Thus, the conversion efficiency of pumping light in each of the uplink and downlink circuits can be enhanced simultaneously.

According to the third embodiment, the basic constitutions adopting the optical filter having variable central transmission wavelength are combined matchedly to the uplink circuit and the downlink circuit to thereby constitute the optical fiber amplifier, so that high-powerization of both of uplink circuit and downlink circuit can be realized even by a single optical fiber amplifier.

There will be described hereinafter a fourth embodiment.

In the fourth embodiment, there will be considered such a case that the basic constitution of the aforementioned second embodiment is matched to each of an uplink circuit and a downlink circuit.

Figure 18:
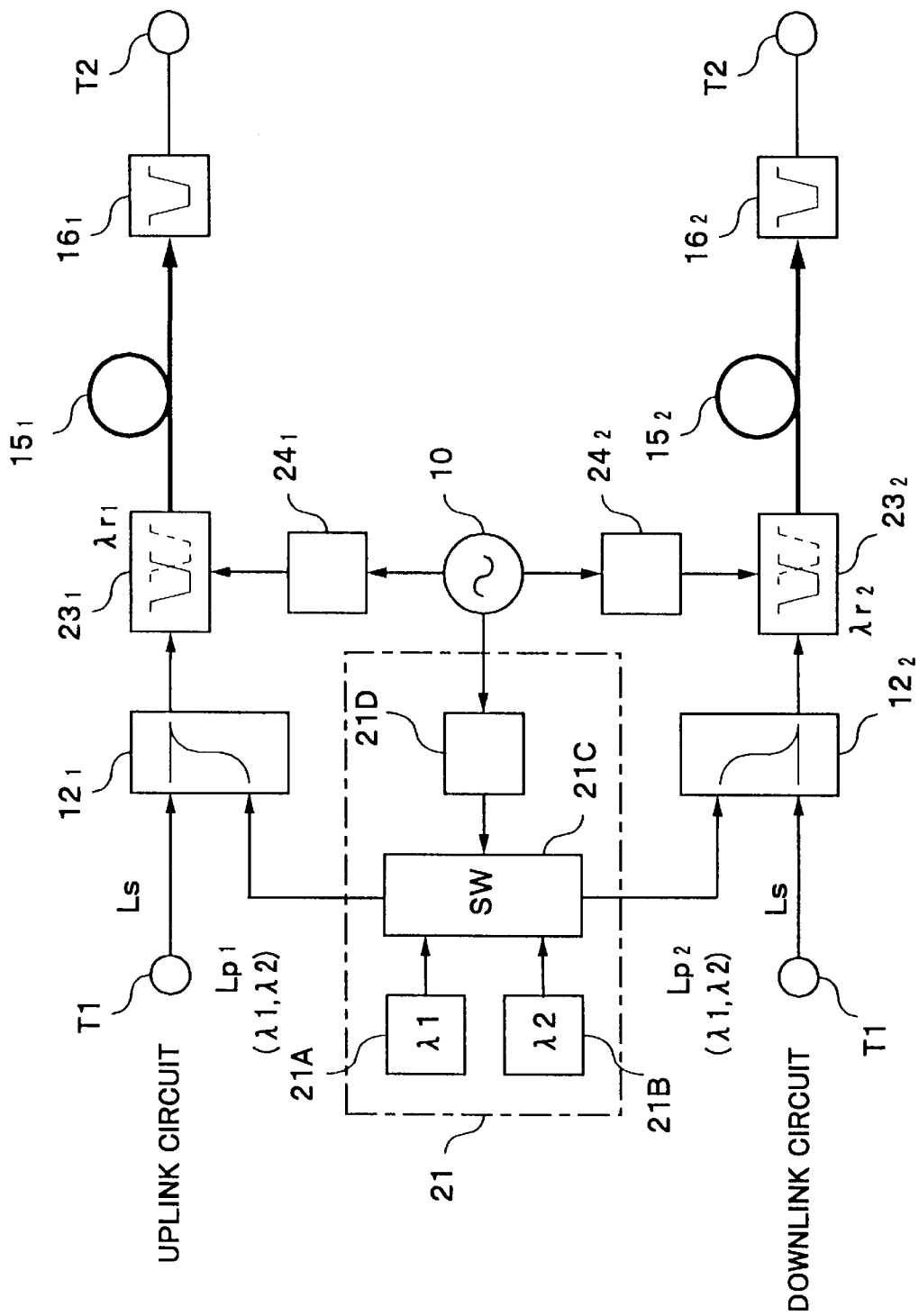
FIG. 18 is a constitutional view of a fourth embodiment of the present invention.

FIG. 18 is a constitutional view of an optical fiber amplifier according to the fourth embodiment.

In FIG. 18, the present optical fiber amplifier is basically obtained by combining two sets of the aforementioned basic constitution adopting the optical filters having variable central reflection wavelengths, matchedly to an uplink circuit and a downlink circuit, respectively. Concretely, there are provided: as constitution common to the uplink circuit and downlink circuit, the oscillator 10 and the pumping light generating part 21; as constitution matched to the uplink circuit, the multiplexer $12_1$, an optical filter $23_1$, a central reflection wavelength modulation circuit $24_1$, active optical fiber $15_1$ and optical reflector $16_1$; and as constitution matched to the downlink circuit, the multiplexer $12_2$, an optical filter $23_2$, a central reflection wavelength modulation circuit $24_2$, the active optical fiber $15_2$ and the optical reflector $16_2$.

Further, the pumping light generating part 21 is provided such as with two pumping light sources 21A and 21B, an optical switch 21C, and an optical-switch driving circuit 21D. The pumping light source 21A consecutively generates the pumping light Lp of central wavelength $\lambda 1$, and sends it to the optical switch 21C. Further, the pumping light source 21B consecutively generates the pumping light Lp of wavelength $\lambda 2$, and sends it to the optical switch 21C. This optical switch 21C operates switchedly by a driving signal from the optical-switch driving circuit 21D, so as to repeat, with a period $\tau$, one state in which the pumping light Lp from the pumping light source 21A is sent to the multiplexer $12_1$ and the pumping light Lp from the pumping light source 21B is sent to the multiplexer $12_2$, and another state in which the pumping light Lp from the pumping light source 21A is sent to the multiplexer $12_2$ and the pumping light Lp from the pumping light source 21B is sent to the multiplexer $12_1$. The driving signal from the optical switch driving circuit 21D is the one generated in response to the electric signal output from the oscillator 10.

Figure 19:
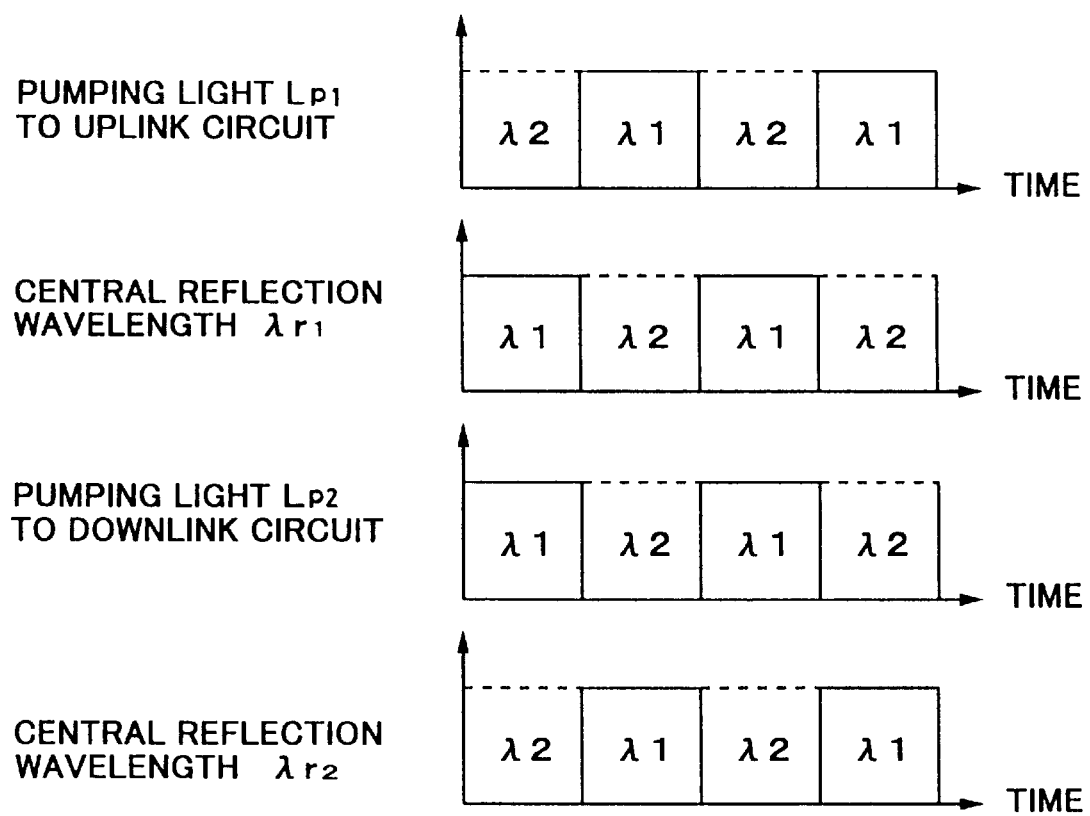
FIG. 19 is a diagram showing a relationship between a central wavelength of pumping light and a central reflection wavelength of optical filter in the fourth embodiment.

The optical filters $23_1$ and $23_2$ are controlled by control signals from the central reflection wavelength modulation circuits $24_1$ and $24_2$, respectively, such that each of the respective central reflection wavelengths $\lambda r_1$ and $\lambda r_2$ has an antiphase relationship and synchronized with the timewise transition of the central wavelength of pumping light $Lp_1$ and $LP_2$ sent from the pumping light generating part 21 via each of the multiplexers $12_1$ and $12_2$. Shown in FIG. 19 are such relationships between the central wavelengths of the pumping light $Lp_1$ and $LP_2$ supplied to the respective circuits and the central reflection wavelengths $\lambda r_1$ and $\lambda r_2$ of the respective optical filters $23_1$ and $23_2$.

In the optical fiber amplifier having such a constitution, there is conducted the operation identical to the aforementioned second embodiment, in each of the uplink circuit and downlink circuit. Namely, the central reflection wavelengths $\lambda r_1$ and $\lambda r_2$ of optical filters $23_1$ and $23_2$ vary in a manner shown in FIG. 19 with respect to the transitions of central wavelength of pumping lights $Lp_1$ and $LP_2$ supplied from the pumping light generating part 21, respectively, so that the pumping lights $Lp_1$ and $Lp_2$ are allowed to make two reciprocations within the active optical fibers $15_1$ and $15_2$, respectively. Thus, the conversion efficiency of pumping light in each of the uplink and downlink circuits can be enhanced simultaneously.

According to the fourth embodiment, the basic constitutions adopting the optical filter having variable central reflection wavelength are also combined matchedly to the uplink circuit and the downlink circuit to thereby constitute the optical fiber amplifier, so that high-powerization of both of uplink circuit and downlink circuit can be realized even by a single optical fiber amplifier.

Figure 20:
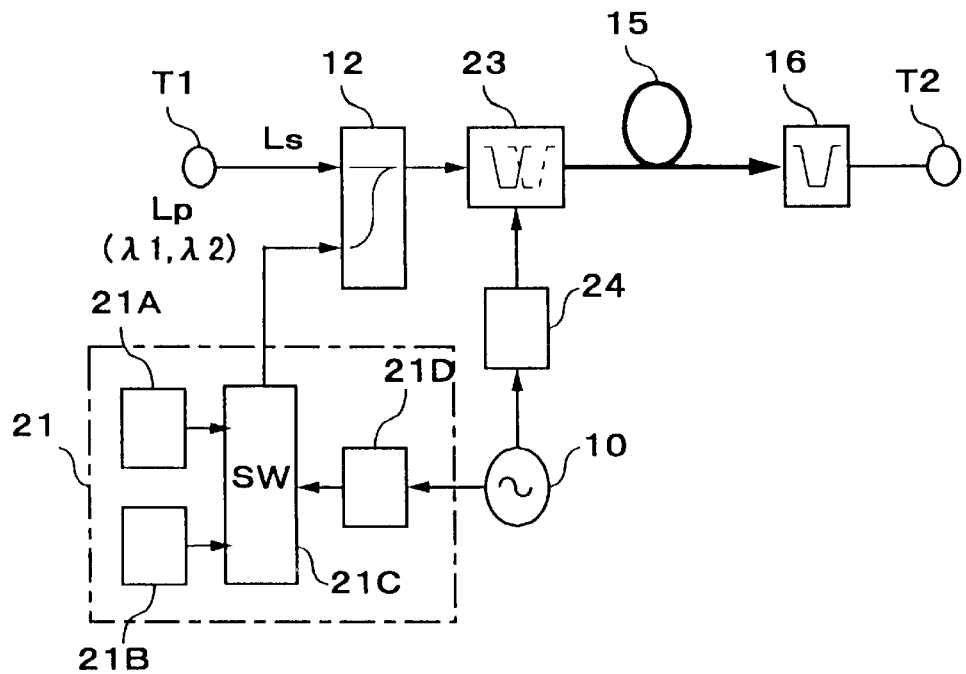
FIG. 20 is a constitutional view of another example of the fourth embodiment.

Although the third and fourth embodiments have been described in a manner matched to two circuits, it is of course possible to apply them to a single circuit. For example, FIG. 20 shows an example in which the constitution of the fourth embodiment is provided for a single circuit. Further, the present invention is also applicable to a situation of three or more circuits, in a manner identical to the above.

There will be described a fifth embodiment hereinafter.

In the fifth embodiment, another constitutional embodiment adopting an optical coupler at the pumping light generating part in the optical fiber amplifier of the fourth embodiment.

Figure 21:
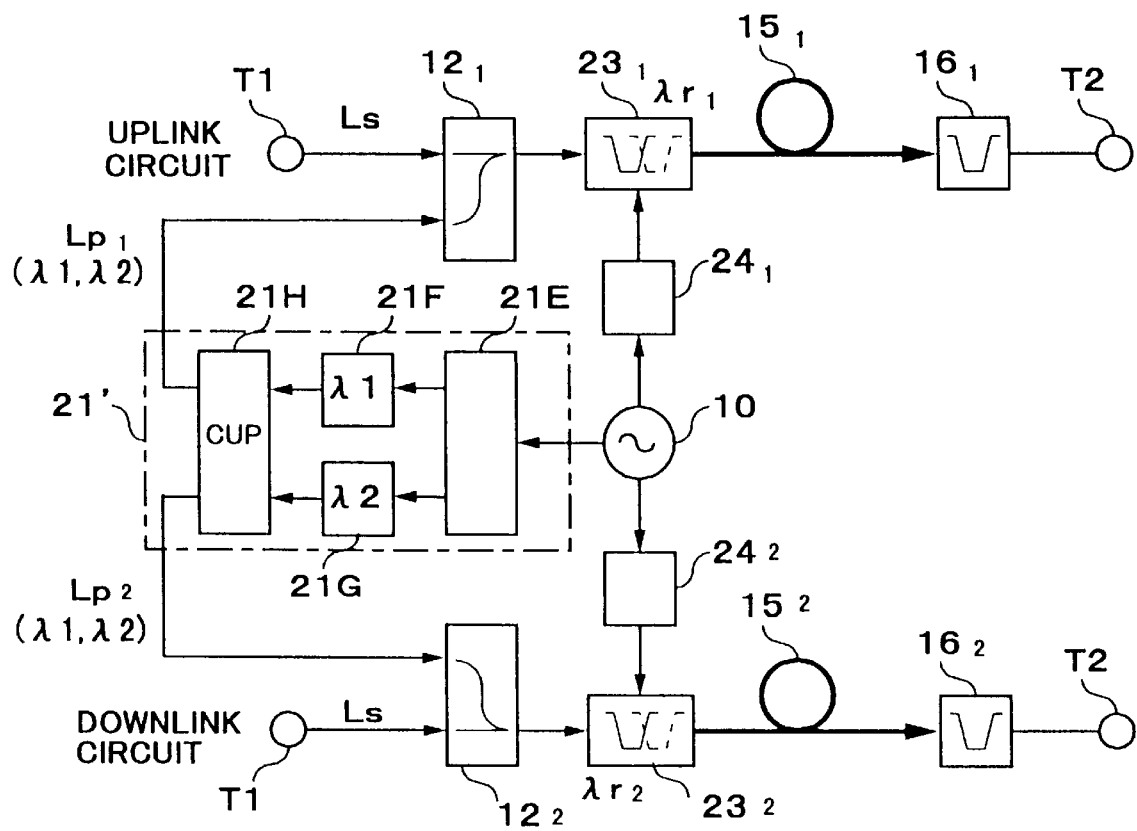
FIG. 21 is a constitutional view of a fifth embodiment of the present invention.

FIG. 21 is a constitutional view of an optical fiber amplifier according to the fifth embodiment.

In FIG. 21, the present optical fiber amplifier is characterized in that, in the constitution of the fourth embodiment, the same has adopted a pumping light generating part 21' provided with an optical coupler, in place of the pumping light generating part 21 provided with the optical switch. Other constitution is identical with that of the fourth embodiment.

The pumping light generating part 21' is constituted of a pumping light-source driving circuit 21E, two pumping light sources 21F and 21G, and an optical coupler 21H. The pumping light-source driving circuit 21E generates, in response to an electric signal from the oscillator 10, a driving signal for alternately driving each of pumping light sources 21F and 21G. The pumping light source 21F generates the pumping light Lp of central wavelength $\lambda 1$, in response to the driving signal from the pumping light-source driving circuit 21E. Also, the pumping light source 21G generates the pumping light Lp of wavelength $\lambda 2$, in response to the driving signal from the pumping light source driving circuit 21E. The optical coupler 21H has two input ports and two output ports, and divides the pumping light Lp input into the appropriate one of the input ports, into two lights so as to output them from both of the output ports to the multiplexers $12_1$ and $12_2$, respectively.

The optical filters $23_1$ and $23_2$ are controlled by control signals from the central reflection wavelength modulation circuits $24_1$ and $24_2$, respectively, such that each of the respective central reflection wavelengths $\lambda r_1$ and $\lambda r_2$ has an antiphase relationship and synchronized with the timewise transition of the central wavelength of each of pumping lights $Lp_1$, and $LP_2$ sent from the pumping light generating part 21' via each of multiplexers $12_1$ and $12_2$. Shown in FIG. 22 are such relationships between the central wavelengths of the pumping light $Lp_1$, and $Lp_2$ supplied to the respective circuits and the central reflection wavelengths $\lambda r_1$ and $\lambda r_2$ of the respective optical filters $23_1$ and $23_2$.

Figure 22:
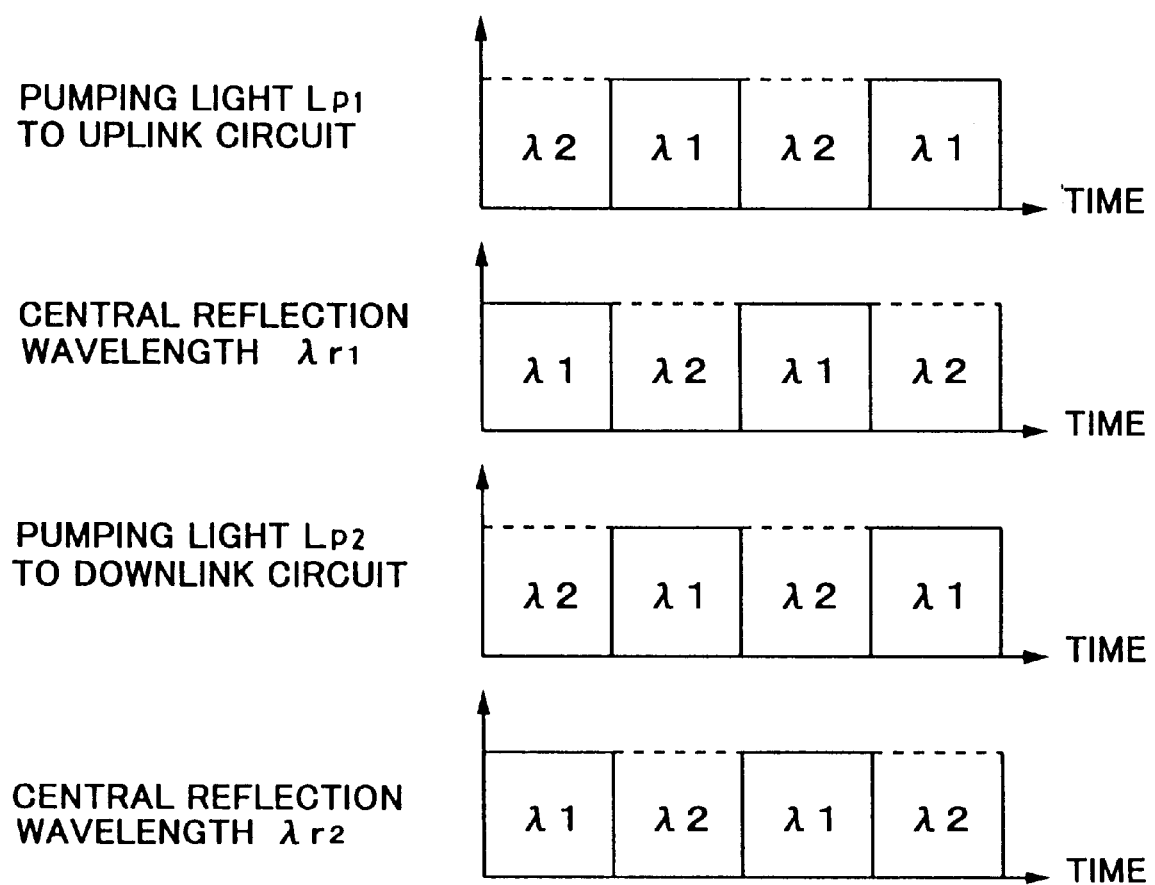
FIG. 22 is a diagram showing a relationship between a central wavelength of pumping light and a central reflection wavelength of optical filter in the fifth embodiment.

Also by the optical fiber amplifier having a constitution adopting the optical coupler at the pumping light generating part, the central reflection wavelengths $\lambda r_1$ and $\lambda r_2$ of optical filters $23_1$ and $23_2$ vary in a manner shown in FIG. 22 with respect to the transitions of central wavelength of pumping lights $Lp_1$ and $Lp_2$ supplied from the pumping light generating part 21', respectively, so that the pumping lights $Lp_1$ and $Lp_2$ are allowed to make two reciprocations within the active optical fibers $15_1$ and $15_2$, respectively. Thus, the conversion efficiency of pumping light in each of the circuits can be enhanced simultaneously. Only, the pumping lights $Lp_1$ and $LP_2$ to be output from the pumping light generating part 21' are provided by dividing the pumping light Lp into two lights by means of the optical coupler 21H. Thus, it is necessary to increase the power of output light of each of the pumping light sources 21F and 21G, in order to obtain power of pumping light comparable to the case where the optical switch is adopted in the pumping light generating part.

There will be described a sixth embodiment hereinafter.

Explained in the sixth embodiment is a constitutional example in which a wavelength-division multiplexing (WDM) coupler is adopted to the pumping light generating part in the optical fiber amplifier of the fourth embodiment.

Figure 23:
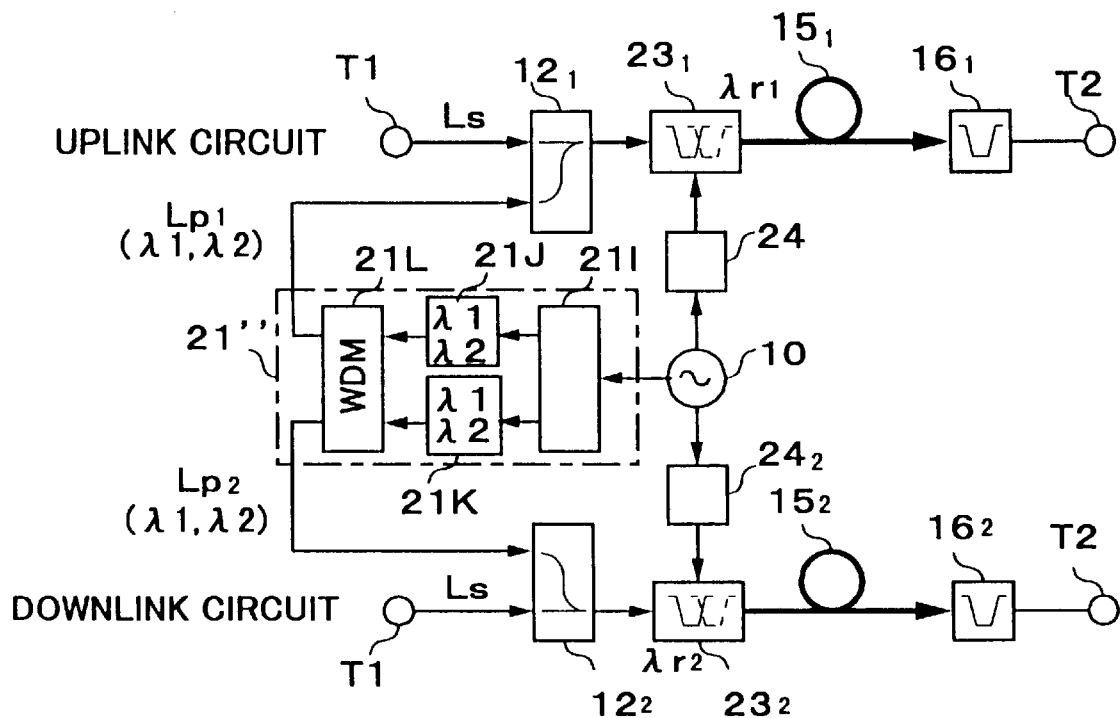
FIG. 23 is a constitutional view of a sixth embodiment of the present invention.

FIG. 23 is a constitutional view of an optical fiber amplifier according to the sixth embodiment.

In FIG. 23, the present optical fiber amplifier is characterized in that the same has adopted a pumping light generating part 21" provided with a WDM coupler, in place of the pumping light generating part 21 provided with the optical switch in the constitution of the fourth embodiment. Other constitution is identical with that of the fourth embodiment.

The pumping light generating part 21" is constituted of a pumping light source driving circuit 21I, two pumping light sources 21J and 21K, and a WDM coupler 21L. The pumping light-source driving circuit 21I generates, in response to an electric signal from the oscillator 10, a driving signal for alternately driving each of pumping light sources 21J and 21K. Each of the pumping light sources 21J and 21K generates simultaneously both of pumping light Lp of central wavelength $\lambda 1$ and pumping light Lp of wavelength $\lambda 2$, in response to the driving signal from the pumping lightsource driving circuit 21I. The WDM coupler 21L has a first input port connected to the pumping light source 21J, a second input port connected to the pumping light source 21K, a first output port connected to the multiplexer $12_1$, and a second output port connected to the multiplexer $12_2$. The transmission characteristic of coupler 21L is such that: when the first input port is input with light of central wavelengths $\lambda 1$ and $\lambda 2$, the light of central wavelength $\lambda 1$ is output from the first output port and the light of central wavelength $\lambda 2$ is output form the second output port; and when the second input port is input with light of central wavelengths $\lambda 1$ and $\lambda 2$, the light of central wavelength $\lambda 1$ is output from the second output port and the light of central wavelength $\lambda 2$ is output from the first output port.

In the optical fiber amplifier having such a constitution, the relationships between the central wavelengths of pumping lights $Lp_1$ and $Lp_2$ supplied to the respective circuits and the central reflection wavelengths $\lambda r_1$ and $\lambda r_2$ of respective optical filters $23_1$ and $23_2$ are established in a manner identical with those shown in FIG. 22, so that the pumping lights $Lp_1$ and $Lp_2$ are allowed to make two reciprocations within the active optical fibers $15_1$ and $15_2$, respectively. Thus, the conversion efficiency of pumping light in each of the circuits can be enhanced simultaneously. Only, in case of adopting the WDM coupler in the pumping light generating part, there are required the pumping light sources 21J and 21K for simultaneously generating pumping lights of wavelengths $\lambda 1$ and $\lambda 2$, respectively. As such, the constitution of the pumping light source is more simplified when an optical switch is adopted in the pumping light generating part.

Figure 24:
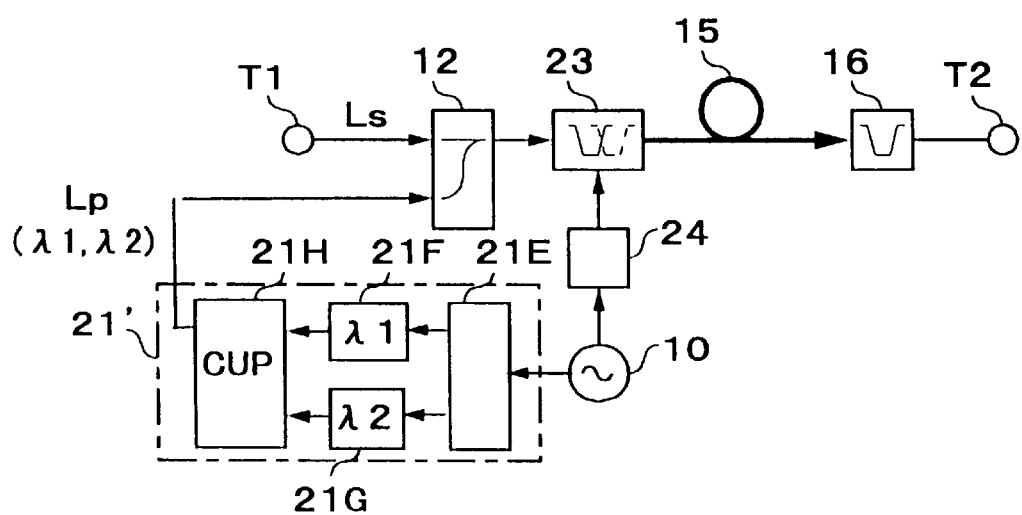
FIG. 24 is a constitutional view of another example of the fifth embodiment.
Figure 25:
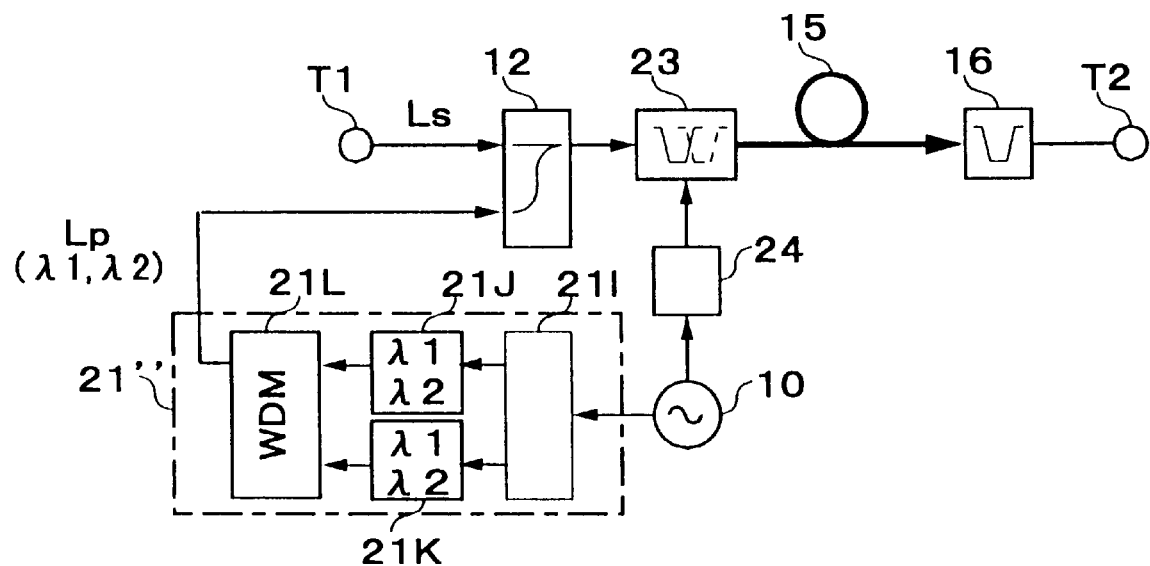
FIG. 25 is a constitutional view of another example of the sixth embodiment.

Although the fifth and sixth embodiments have been described in a manner matched to two circuits, it is possible to apply them to a single circuit or three or more circuits, respectively. For example, FIGS. 24 and 25 show examples in which the constitutions of the fifth and sixth embodiments are provided for a single circuit, respectively.

There will be described a seventh embodiment hereinafter.

In the seventh embodiment, there is described such a case that the functions of the optical filter 23 and optical reflector 16 coupled to respective ends of active optical fiber 15 are realized by diffraction gratings (fiber gratings) formed within the active optical fiber 15, such as in the optical fiber amplifier of the aforementioned second embodiment.

Figure 26:
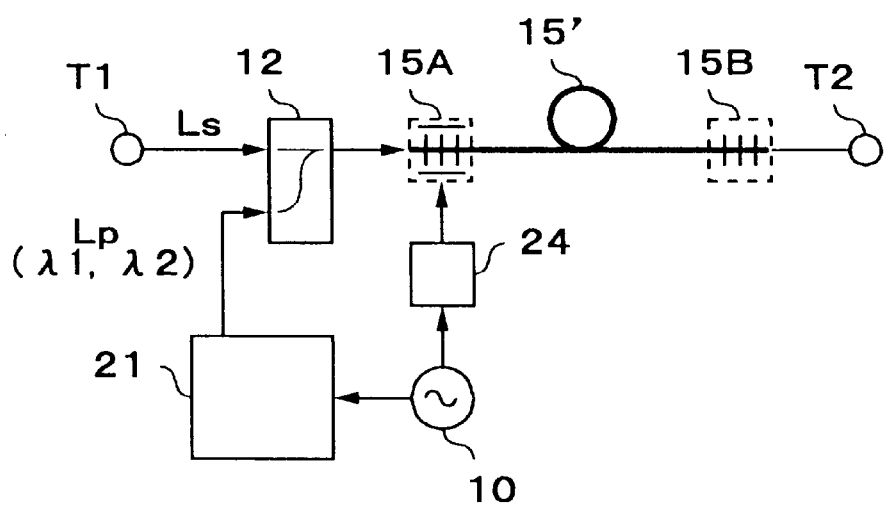
FIG. 26 is a constitutional view of a seventh embodiment of the present invention.

FIG. 26 is a constitutional view of an optical fiber amplifier according to the seventh embodiment.

As shown in FIG. 26, the present optical fiber amplifier is characterized in that the same has adopted an active optical fiber 15' provided with an optical filter part 15A serving as optical filter area and with a light reflection part 15B serving as pumping light reflection area, instead of the optical filter 23 having variable central reflection wavelength and the optical reflector 16, adopted in the second embodiment. Other constitution is identical with that of the second embodiment.

Figure 27:
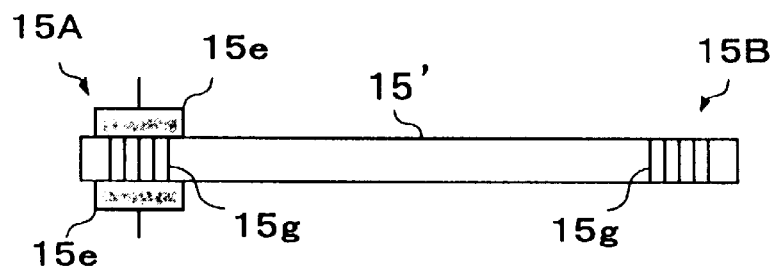
FIG. 27 is a constitutional view of an active optical fiber in the seventh embodiment.

As shown in FIG. 27, the active optical fiber 15' is formed with fiber gratings 15g which are diffraction gratings, near the respective ends of the optical fiber. These fiber gratings 15g are prepared such as by irradiating ultraviolet rays to a core within an optical fiber from the outside, to thereby provide the core with a periodical variation of refractive index, which results in a filtering characteristic.

Typically, a central reflection wavelength of a fiber grating depends on its refractive index, to a great extent. Thus, it is possible to makes a central reflection wavelength of fiber grating variable, by varying its refractive index, such as making use of pressure, tension, sound wave, ultrasonic wave, vibration and temperature.

In this embodiment, there is constituted the optical filter part 15A having a variable central reflection wavelength, such as by providing electrodes 15e near the fiber gratings 15g formed at the pumping light input side (left side in the figure) of the active optical fiber. This optical filter part 15A has a characteristic identical with that of optical filter 23 of the second embodiment, which reflects only a pumping light Lp in a predetermined wavelength range. Further, the central reflection wavelength $\lambda r$ of part 15A is varied in response to the control signal from the central reflection wavelength modulation circuit 24, which is applied to the electrodes 15e.

Meanwhile, the light reflection part 15B is constituted by the fiber gratings 15g formed at the side (right side in the figure) opposite to the pumping light input side of the active optical fiber. This light reflection part 15B has a characteristic identical with that of optical reflector 16 of the second embodiment, which transmits the signal light Ls and reflects the pumping light Lp of any wavelength.

In the optical fiber amplifier constituted to adopt the aforementioned active optical fiber 15', the central reflection wavelength $\lambda r$ of optical filter part 15A is varied in an antiphase relationship and synchronously with the central wavelength of the pumping light Lp supplied from the pumping light generating part 21. As such, the pumping light Lp is repeatedly reflected between the optical filter part 15A and the light reflection part 15B to thereby make two reciprocations within the active optical fiber 15'. Thus, the conversion efficiency of pumping light can be enhanced, similarly to the second embodiment. In addition to this effect, by adopting the active optical fiber 15', there can be removed any insertion loss and coupling loss such as due to optical filter 23 and optical reflector 16, so that the conversion efficiency of pumping light can be further enhanced while simplifying the constitution of the optical fiber amplifier.

There will be described an eighth embodiment hereinafter.

In the eighth embodiment, there is described such a case that the functions of the optical filter 13 and optical reflector 16 coupled to respective ends of active optical fiber 15 are realized by diffraction gratings (fiber gratings) formed within the active optical fiber 15, such as in the optical fiber amplifier of the aforementioned first embodiment.

Figure 28:
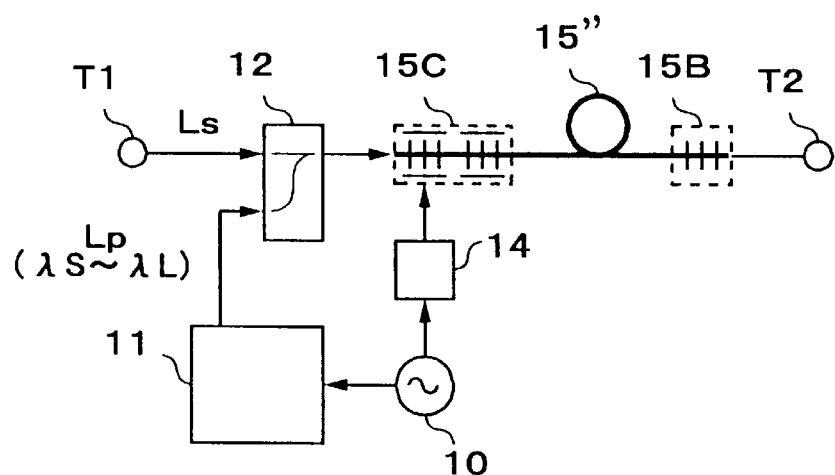
FIG. 28 is a constitutional view of an eighth embodiment of the present invention.

FIG. 28 is a constitutional view of an optical fiber amplifier according to the eighth embodiment.

As shown in FIG. 28, the present optical fiber amplifier is characterized in that the same has adopted an active optical fiber 15" provided with an optical filter part 15C serving as optical filter area and with the light reflection part 15B serving as pumping light reflection area, instead of the optical filter 13 having variable central transmission wavelength and the optical reflector 16 adopted in the first embodiment. Other constitution is identical with that of the first embodiment.

Figure 29:
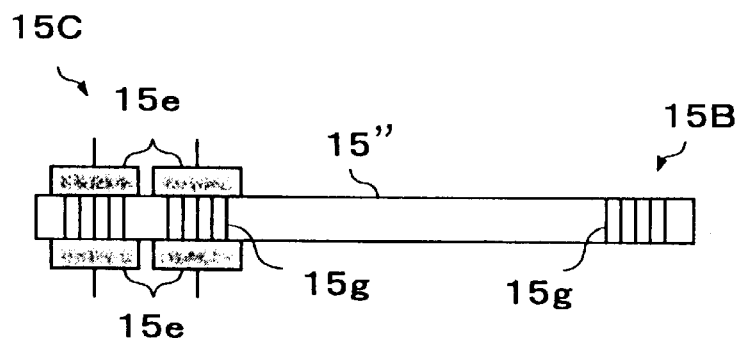
FIG. 29 is a constitutional view of an active optical fiber in the eighth embodiment.
Figure 30:
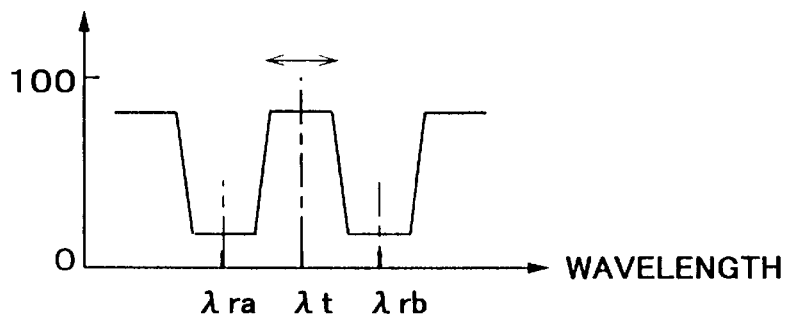
FIG. 30 is a diagram showing a transmission characteristic of an optical filter part in the eighth embodiment.
Figure 31:
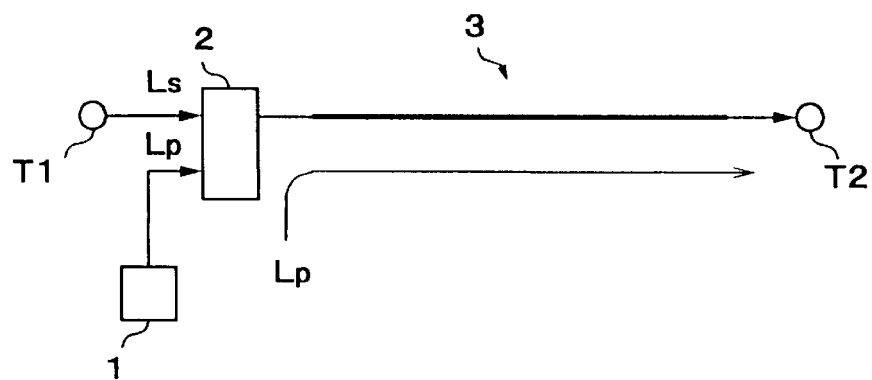
FIG. 31 is a view showing an exemplary basic constitution of a conventional optical fiber amplifier.
Figure 32:
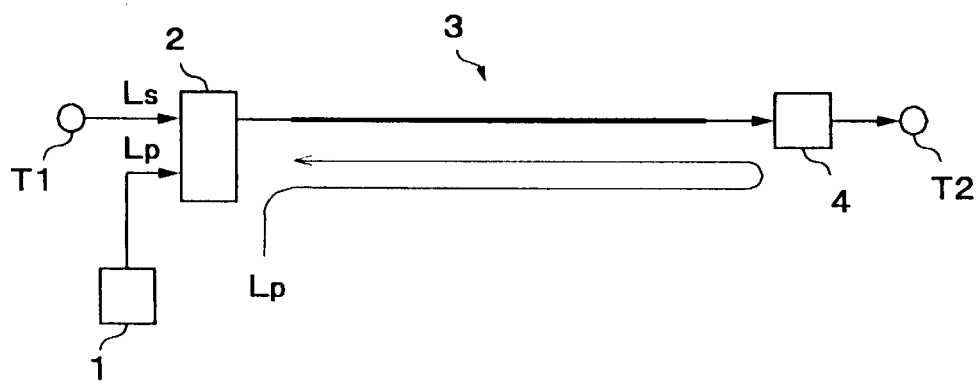
FIG. 32 is a view showing an exemplary constitution of a conventional optical fiber amplifier externally attached with an optical reflector.

As shown in FIG. 29, the active optical fiber 15" is formed with the optical filter part 15C having a variable central transmission wavelength by being serially provided near one end of the pumping light input side (left side of the figure), through the longitudinal direction of fiber 15", two sets of constitutions identical with that of optical filter part 15A having a variable central reflection wavelength which is formed within the active optical fiber 15' in the seventh embodiment. As shown in the transmission characteristic diagram of FIG. 30, by establishing a predetermined wavelength difference between the respective central reflection wavelengths $\lambda ra$ and $\lambda rb$ of the two central reflection wavelength variable type optical filters which are arranged in series, there is formed a transmission range having a predetermined wavelength width between the wavelength $\lambda ra$ and wavelength $\lambda rb$. The center of this transmission range is regarded as the central transmission wavelength $\lambda t$. This central transmission wavelength $\lambda t$ varies in response to the control signal from the central reflection wavelength modulation circuit 14, which is applied to the electrodes 15e. Formed near the other end (right side in the figure) opposite to the pumping light input side of the active optical fiber, is a light reflection part 15B identical with the case of the aforementioned seventh embodiment.

In the optical fiber amplifier constituted to adopt the aforementioned active optical fiber 15", the central transmission wavelength $\lambda t$ of optical filter part 15C is varied consistently with the central wavelength of pumping light Lp supplied from the pumping light generating part 21. As such, the pumping light Lp is repeatedly reflected between the optical filter part 15A and light reflection part 15B to thereby make two or more reciprocations within the active optical fiber 15". In addition, there can be removed any insertion loss and coupling loss such as due to optical filter 23 or optical reflector 16, so that the conversion efficiency of pumping light can be further enhanced. Further, the constitution of the optical fiber amplifier can be simplified, compared to that of the first embodiment.

Although the seventh and eighth embodiments are constituted to include the electrodes 15e in order to control the central reflection wavelength $\lambda r$ or central transmission wavelength $\lambda t$, the present invention is not limited thereto. It is possible to provide, near the fiber gratings 15g, such as heater, cooler, coil, and pressure element. Further, although the active optical fiber 15' or 15", such as formed with fiber gratings, has been applied to the first or second embodiment, it is of course possible to apply such a fiber to the fourth to sixth embodiments or the third embodiment. Moreover, the fiber gratings formed in the active optical fiber may have uniform or different values with respect to the central reflection wavelength and the reflectance per unit length in the longitudinal direction of the fiber. By appropriately establishing the central reflection wavelength or the reflectance per unit length in the longitudinal direction, it is possible to realize high-powerization of the optical fiber amplifier and reduction in the noise factor thereof.

Lastly, in the aforementioned first through eighth embodiments, there have been described about forward pumping cases. However, the present invention is not limited to the forward pumping, and can be also applied to backward pumping and bi-directional pumping. Only, in case of bi-directional pumping, there shall be differently established the wavelength of pumping light to be supplied from the front side of fiber and that of pumping light to be supplied from the rear side of fiber, from each other, and each constitution of the aforementioned embodiments shall be provided matchedly to each of the pumping lights in the forward and backward directions.

What we claimed are:

1. An optical fiber amplifier comprising:

signal generating means for generating a signal having a previously set repeating frequency;

pumping light generating means for generating, based on said signal from said signal generating means, a pumping light of which central wavelength is periodically varied;

an active optical fiber doped with a rare earth element;

pumping light input means for inputting said pumping light output from said pumping light generating means, into one end of said active optical fiber;

an optical filter of central transmission wavelength variable type inserted in an optical path leading from said pumping light generating means up to one end of said active optical fiber, said optical filter having a transmission wavelength band narrower than a wavelength variation range of said pumping light, and said transmission wavelength band of said optical filter having a central transmission wavelength which is varied consistently with said central wavelength of said pumping light, based on said signal from said signal generating means; and pumping light reflection means provided at the other end of said active optical fiber, for reflecting said pumping light and transmitting said signal light;

wherein said central wavelength of said pumping light and said central transmission wavelength of said optical filter of central transmission wavelength variable type are varied such that the pumping light, which is input into said active optical fiber and then reflected by said pumping light reflection means, is reflected at least one time at said optical filter of central transmission wavelength variable type.

2. An optical fiber amplifier of claim 1, wherein said central transmission wavelength of said optical filter of central transmission wavelength variable type has an in-phase relationship and is synchronized with said central wavelength of said pumping light.

3. An optical fiber amplifier of claim 2, wherein said central wavelength of said pumping light and said central transmission wavelength of said optical filter of central transmission wavelength variable type are varied with a timewise transition in a sawtooth waveform.

4. An optical fiber amplifier of claim 1, wherein said active optical fiber is provided with an optical filter area comprising a diffraction grating of central transmission wavelength variable type arranged near the one end of said active optical fiber, said diffraction grating has a transmission wavelength band narrower than said wavelength variation range of said pumping light, said transmission wavelength band of said diffraction grating has a variable central transmission wavelength, said diffraction grating transmits said signal light, and said optical filter area functions as said optical filter of central transmission wavelength variable type.

5. An optical fiber amplifier of claim 4, wherein said optical filter area comprises two diffraction gratings of central reflection wavelength variable type, which are connected in series in the longitudinal direction of said optical fiber, and which have a predetermined wavelength difference between the respective central reflection wavelengths.

6. An optical fiber amplifier of claim 1 matched to a plurality of circuits, wherein said active optical fiber, said pumping light input means, said optical filter of central transmission wavelength variable type, and said pumping light reflection means are provided for each of said plurality of circuits, said signal generating means supplies control signals to said pumping light generating means and to each of said optical filters of central transmission wavelength variable type, and said pumping light generating means supplies said pumping light to each of said pumping light input means.

7. An optical fiber amplifier comprising:

signal generating means for generating a signal having a previously set repeating frequency;

pumping light generating means for generating, based on said signal from said signal generating means, a pumping light of which central wavelength is periodically varied;

an active optical fiber doped with a rare earth element;

pumping light input means for inputting said pumping light output from said pumping light generating means, into one end of said active optical fiber;

an optical filter of central reflection wavelength variable type inserted in an optical path leading from said pumping light generating means up to one end of said active optical fiber, said optical filter having a reflection wavelength band narrower than a wavelength variation range of said pumping light, and said reflection wavelength band of said optical filter having a central reflection wavelength which is varied mutually differently from said central wavelength of said pumping light, based on said signal from said signal generating means; and pumping light reflection means provided at the other end of said active optical fiber, for reflecting said pumping light and transmitting said signal light;

wherein said central wavelength of said pumping light and said central reflection wavelength of said optical filter of central reflection wavelength variable type are varied such that the pumping light, which is input into said active optical fiber and then reflected by said pumping light reflection means, is reflected one time at said optical filter of central reflection wavelength variable type.

8. An optical fiber amplifier of claim 7, wherein said central reflection wavelength of said optical filter of central reflection wavelength variable type has an antiphase relationship and is synchronized with said central wavelength of said pumping light.

9. An optical fiber amplifier of claim 7, wherein said signal generating means generates a signal at a repeating frequency which is equal to a reciprocal number of a time length required for said pumping light to make a reciprocation between said optical filter of central reflection wavelength variable type and said pumping light reflection means.

10. An optical fiber amplifier of claim 7, wherein said central wavelength of said pumping light and said central reflection wavelength of said optical filter of central reflection wavelength variable type are varied with a timewise transition in a rectangular waveform or sine waveform.

11. An optical fiber amplifier of claim 7, wherein said active optical fiber is provided with an optical filter area comprising a diffraction grating of central reflection wavelength variable type arranged near the one end of said active optical fiber, said diffraction grating has a reflection wavelength band narrower than said wavelength variation range of said pumping light, said reflection wavelength band of said diffraction grating has a variable central reflection wavelength, said diffraction grating transmits said signal light, and said optical filter area functions as said optical filter of central reflection wavelength variable type.

12. An optical fiber amplifier of claim 7 matched to a plurality of circuits, wherein
   said active optical fiber, said pumping light input means, said optical filter of central reflection wavelength variable type, and said pumping light reflection means are provided for each of said plurality of circuits,
   said signal generating means supplies control signals to said pumping light generating means and to each of said optical filters of central reflection wavelength variable type, and
   said pumping light generating means supplies said pumping light to each of said pumping light input means.

13. An optical fiber amplifier of claim 1, wherein said pumping light generating means comprises a pumping light source for generating a pumping light, and a pumping light wavelength modulation circuit for modulating a central wavelength of said pumping light generated by said pumping light source, based on said signal from said signal generating means.

14. An optical fiber amplifier of claim 1, wherein said pumping light generating means comprises a plurality of pumping light sources for generating pumping lights of which central wavelengths are different from one another, an optical switch capable of being input with said pumping lights from each of said pumping light sources, and of selecting at least one of said pumping lights to thereby output the same, and an optical switch driving circuit for generating a driving signal for driving said optical switch, based on said signal from said signal generating means.

15. An optical fiber amplifier of claim 1, wherein said pumping light generating means comprises a plurality of pumping light sources for generating pumping lights of which central wavelengths are different from one another, a pumping light source driving circuit for controlling driving states of each of said pumping light sources, based on said signal from said signal generating means, and an optical coupler, which is input with each of said pumping lights and outputs the same to said pumping light input means.

16. An optical fiber amplifier of claim 1, wherein said pumping light generating means comprises two pumping light sources, each of which is adapted to generate two pumping lights having central wavelengths different from each other, a pumping light-source driving circuit for controlling driving states of each of said pumping light sources, based on said signal from said signal generating means, and a wavelength-division multiplexing coupler, which is input with said pumping lights from each of said pumping light sources and multiplexes wavelengths of said pumping lights to thereby output them to said pumping light input means.

17. An optical fiber amplifier of claim 1, wherein said active optical fiber is provided with a pumping light reflection area comprising a diffraction grating arranged near the other end of said active optical fiber, said diffraction grating reflects said pumping light and transmits said signal light, and said pumping light reflection area functions as said pumping light reflection means.

18. An optical fiber amplifier of claim 1, wherein said repeating frequency of said signal generating means is in a range from 100 kHz to 100 MHz.

19. An active optical fiber doped with a rare earth element, comprising:
   an optical filter area comprising a diffraction grating of central transmission wavelength variable type arranged near one end of said active optical fiber, said diffraction grating having a transmission wavelength band narrower than a wavelength variation range of input pumping light, said transmission wavelength band of said diffraction grating having a variable central transmission wavelength, and said diffraction grating transmitting a signal light; and
   a pumping light reflection area comprising a diffraction grating arranged near the other end of said active optical fiber, said diffraction grating being adapted to reflect said pumping light and to transmit said signal light.

20. An active optical fiber doped with a rare earth element, comprising:
   an optical filter area comprising a diffraction grating of central reflection wavelength variable type arranged near one end of said active optical fiber, said diffraction grating having a reflection wavelength band narrower than a wavelength variation range of input pumping light, said reflection wavelength band of said diffraction grating having a variable central reflection wavelength, and said diffraction grating transmitting a signal light; and
   a pumping light reflection area comprising a diffraction grating arranged near the other end of said active optical fiber, said diffraction grating being adapted to reflect said pumping light and to transmit said signal light.

* * * * *